United States Patent [19]

Worthington

[11] Patent Number: 5,231,510

[45] Date of Patent: Jul. 27, 1993

[54] INFORMATION RETRIEVAL SYSTEM UTILIZING FACSIMILE COMMUNICATION AND PAPER FORMS WITH PRESET FORMAT

[76] Inventor: Cristian A. Worthington, 5131 Morris St., Apt. 2, Halifax, Nova Scotia, Canada, B3J 1A9

[21] Appl. No.: 688,820

[22] Filed: Apr. 22, 1991

[51] Int. Cl.[5] .......................................... H04M 11/00
[52] U.S. Cl. ...................................... 358/400; 379/100
[58] Field of Search ........................ 358/400, 402–403, 358/468; 379/100

[56] References Cited

U.S. PATENT DOCUMENTS

| | | | |
|---|---|---|---|
| 4,893,333 | 1/1990 | Baran et al. | 358/468 |
| 4,941,170 | 7/1990 | Herbst | 358/440 |
| 4,941,685 | 7/1990 | Anderson | 358/400 |
| 4,996,707 | 2/1991 | O'Malley et al. | 379/100 |
| 5,095,445 | 3/1992 | Sekiguchi | 358/400 |

Primary Examiner—Stephen Brinich
Attorney, Agent, or Firm—Philip W. Jones

[57] ABSTRACT

A system for the automated transfer of data includes a means for transmitting a paper form by telephone, a means for receiving the transmitted image of that form, and a computer connected to the receiving means. The format on the paper form is prepared using a program on the computer, and a copy of that format is stored in the computer. The format includes option boxes, alphanumeric blocks for specific data collection and blank figure-8 boxes for collecting numerical information. An operator of the computer selects the particular format required according to the needs of the location(s) having the transmitting means. The format is then transmitted to the location(s) either physically as a paper form or electronically over the telephone. Personnel at the location(s) select from the various options on the paper form, and return an image of the form by telephone to the receiving means. Without requiring human supervision, the computer interprets the responses using its stored knowledge of the positions on the form at which the various options were placed when the particular format was created. The response may include data that the computer adds to data bases or may be a command such as asking the computer to send the current state of a data base by telephone to the location(s).

6 Claims, 4 Drawing Sheets

FIG. 2 (NOT DRAWN TO SCALE)

AUTOMOTIVE LISTING SERVICE

☐ ADD  ■ INQUIRE  ☐ DELETE  ☐ STOCK REPORT

MANUFACTURER'S CODE OR MODEL NAME

| A | B | C | D | E | F | G | H | I | J | K | L | M | N | O | P | Q | R | S | T | U | V | W | X | Y | Z | 1 | 2 | 3 | 4 | 5 | 6 | 7 | 8 | 9 | 0 |

- ■ STANDARD TRANS.
- ☐ AUTOMATIC TRANS.
- ☐ 4 CYLINDER
- ■ 6 CYLINDER
- ☐ 8 CYLINDER
- ■ TURBO
- ☐ DIESEL
- ☐ FOUR WHEEL DRIVE

- ☐ 2 DOOR
- ■ 4 DOOR
- ☐ HATCHBACK
- ■ POWER STEERING
- ☐ POWER WINDOWS
- ☐ POWER LOCKS

- ■ BLK  ☐ WHT  ☐ GRY
- ☐ RED  ☐ BLU  ☐ BRN

PRICE  WHEEL BASE

KM's  ZONE

STOCK NUMBER  YEAR

FIG. 5

INFORMATION RETRIEVAL SYSTEM UTILIZING FACSIMILE COMMUNICATION AND PAPER FORMS WITH PRESET FORMAT

The invention relates to a system for the automated transfer of data, and more specifically, to a system in which telephonic transmissions provide the interface between a paper form carrying information and a computer capable of interpreting that information.

Devices for transmitting copies of documents over telephone lines, commonly called 'facsimile machines', are gaining in popularity. Unlike 'modems', which allow communication by phone line of text only, facsimile machines provide a means for phone transmission of both text and graphics. A facsimile machine creates an electronic image from a two-dimensional pictorial paper image, which may be solely text or may be text plus graphics, and transmits that electronic image to another facsimile machine which then recreates the pictorial image. Recently, a 'facsimile board' has become available for personal computers. When equipped with such a board, a computer is able to form an image in its memory of a pictorial image fed into a facsimile machine at another location. A pictorial image can be created on the computer screen from the memory contents, the computer user thereby seeing a copy of the pictorial image fed into the facsimile machine at the other location.

While the opportunity for a computer user to see almost instantaneously a copy of the pictorial images on a paper form fed into a facsimile machine at another location is very useful, an even more useful advance would be a system that allowed a computer to automatically interpret the images contained on the paper form and make use of information in those images. This invention relates to such an automated telephonic data transfer system.

The system to be described has the further advantages that it compensates for fluctuations in the rate at which the paper form is fed into the transmitting facsimile machine, and is capable of differentiating between the top and bottom of a paper form and between a series of such forms. By use of threshold recognition standards, the system also protects against transmission errors caused by such factors as dust on the scanning optics of a transmitting facsimile machine.

The system of the invention allows for automated transfer of data by telephone between a central location and a series of other locations. It comprises a telephonic data transmitting terminal at each of the other locations, each transmitting terminal being capable of transforming data on a paper form having a specified format into transmittable electronic images. It further comprises a telephonic data receiving terminal at the central location, the receiving terminal being adapted to receive the electronic images. The system still further comprises a computer adapted to be connected to the receiving terminal and capable of interpreting the electronic images received by the receiving terminal based on a knowledge of the specified format on the paper form.

The computer may also be capable of creating data files from the interpreted electronic images, the data files having a content corresponding to the data on the paper form. The computer may additionally be capable of using the content of the data files to continuously update a series of internal data bases.

The specified format for the paper form may be generated by the computer. If each of the telephonic data transmitting terminals also has a receiving capability and the telephonic data receiving terminal also has a transmitting capability, i.e. standard 'facsimile' machines are utilized for the terminals, the specified format for the paper may be transmitted from the receiving terminal to each of the transmitting terminals. Also, at least some of the other locations may be capable of accessing data in the series of data bases in the computer through their respective receiving terminals.

Each paper form may have a pair of first markings, each first marking extending along a respective opposite edge of the paper parallel to the direction in which the paper form is adapted to be fed into the transmitting terminal. The pair of first markings are utilized by the computer as a frame of reference for compensating for any fluctuations in the rate at which the paper form is fed into a transmitting terminal. Additionally, each paper form may have a pair of second markings, each second marking extending along a respective opposite end of the paper normal to the direction in which the paper form is adapted to be fed into the transmitting terminal. The pair of second markings are utilized by the computer to differentiate between the top and bottom of each paper form and to differentiate between a sequence of such forms.

The invention is also a process for transferring data to a central location having a telephonic data receiving terminal from a series of other locations each having a telephonic data transmitting terminal. The process comprises the steps of, firstly, preparing multiple copies of a paper form having a specified format. The second step consists of distributing at least one copy of the paper form to each of the other locations. The third step consists of receiving on the receiving terminal electronic images of data on the paper form fed into a transmitting terminal. The fourth step consists of interpreting the received electronic images by means of a computer connected to the receiving terminal and having knowledge of the specified format on the paper form in use at the other locations. The specified format for the paper form used in the first step may be prepared by the computer connected to the receiving terminal for interpreting the electronic images in the fourth step.

The system of the invention will next be described in greater detail by means of a preferred embodiment, utilizing the accompanying drawings, in which:

FIG. 5 is a schematic illustration of a format on a paper form used for an automotive listing service.

Figure 1:
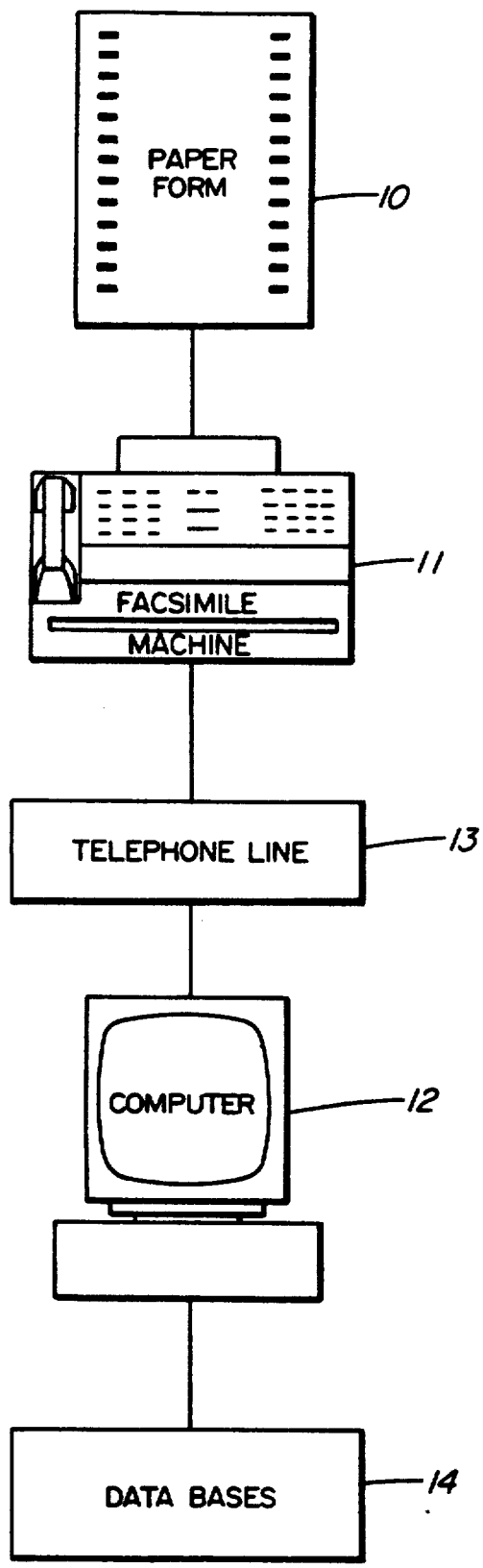
FIG. 1 is a schematic illustration of the data flow path in the system of the preferred embodiment.

A general description of the invention will be provided with reference to FIG. 1. A paper form 10 is fed into a facsimile machine 11 at a location removed from a computer 12 having mounted internally a facsimile board (not shown). Facsimile machine 11 is connected to the facsimile board in computer 12 by a telephone line 13, and when a telephone connection is made between the two, an image is created in the memory of computer 12 of the pictorial image on the face of paper form 10. The pictorial image on paper form 10 has a specified format comprising a series of multiple-choice boxes from which a user has made selections. Computer 12 previously generated the specified format for paper form 10, and that same software program knows how to interpret the image created in memory when a copy of a completed paper form 10 is received. The information retrieved from the memory image of paper form 10 may be data which can be used by the computer program to update data bases 14 in the computer, or that information may be commands which lead the computer to take further action. For instance, the system would be applicable to a branch store that wished to send information on its current inventory to its head office, but would also allow the branch store to query head office as to the availability of certain items. The system allows a computer at the head office to both receive and transmit information without using the time of the head office personnel. The system requires only that each branch store have a facsimile machine.

The general format of the paper form 10 will next be explained with reference to FIG. 2. That general format, with the addition of extra format specific to the particular application, is generated by the computer. After being created on the screen of the computer, the complete format is either produced on a paper form which is mailed or otherwise transmitted to other locations connected to the system, or the complete format is simply transmitted through the facsimile board of the computer and the paper form is produced by the facsimile machine at each of the other locations.

Figure 2:
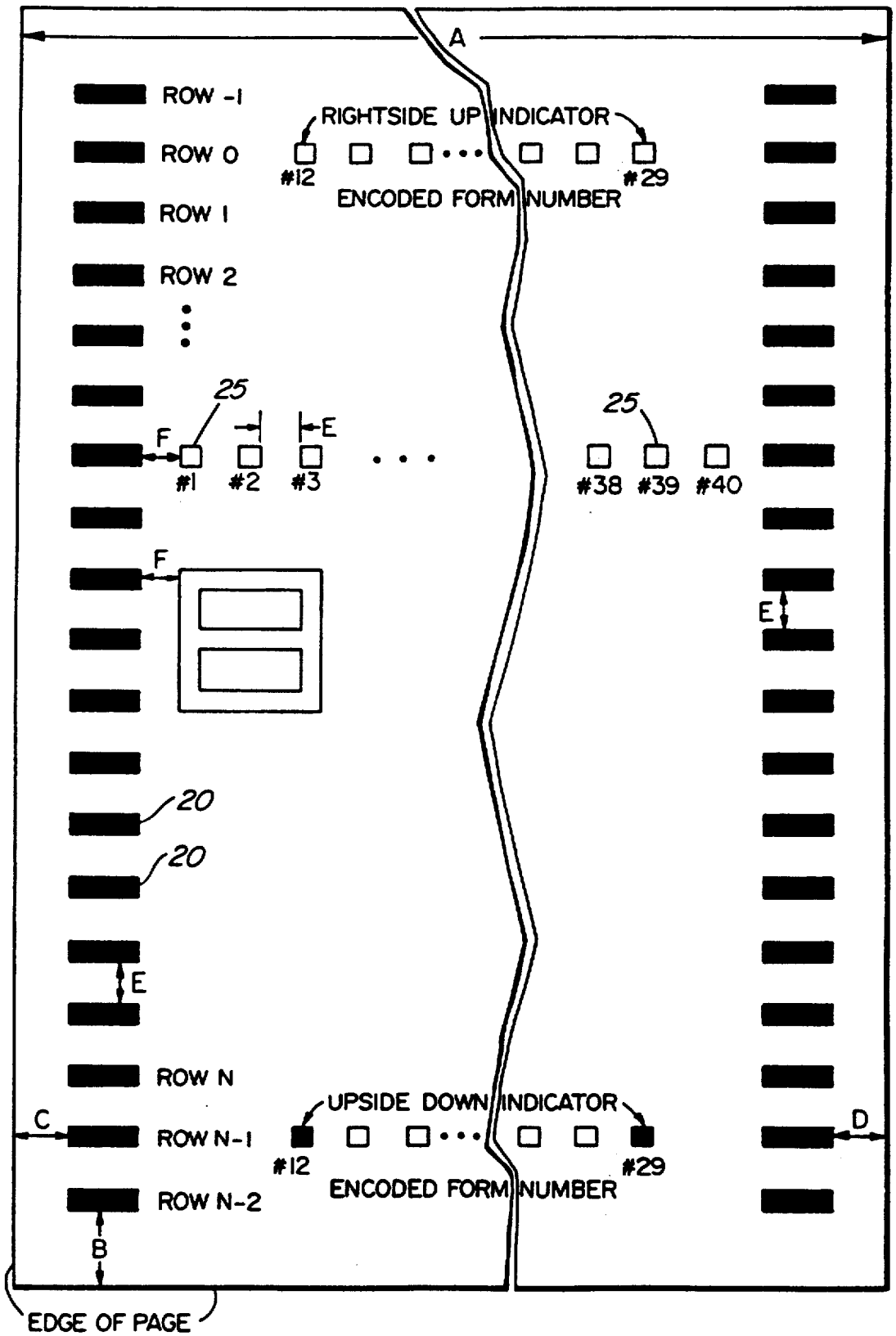
FIG. 2 is an illustration of a format on a paper form of the preferred embodiment.

The general format consists of a series of timing markers 20 each extending along a respective opposite edge of the paper form parallel to the direction in which the paper form is adapted to be fed into the facsimile machine, as shown in FIG. 2. The number of rows of timing markers depends upon the length of the paper form being analyzed; for our purposes, those rows are numbered '−1' to 'N+2'. Inline with the pair of Row 0 timing markers are 18 empty boxes, and inline with the pair of Row N+1 timing markers are another 18 boxes. The outer pair of these boxes are left unfilled as a Right-side Up Indicator, but are filled as an Upside Down Indicator. The 16 boxes internal of each outer pair of boxes is the Encoded Form Number; these boxes contain a digital representation of the number identifying the form. As an example, when the computer program senses the 18 boxes on the leading edge of a paper form fed into a facsimile machine to be 1 0000 0000 0000 0101 1, the program knows that form 5 has been entered into the machine and that that form is upside down. In interpreting the information on the memory page created from the form, the program is able to compensate for the form being received upside down. The space extending between the pair of timing markers in Row 1 and the pair of timing markers in Row N is the space available on the paper form for the specific application format.

Figure 3:
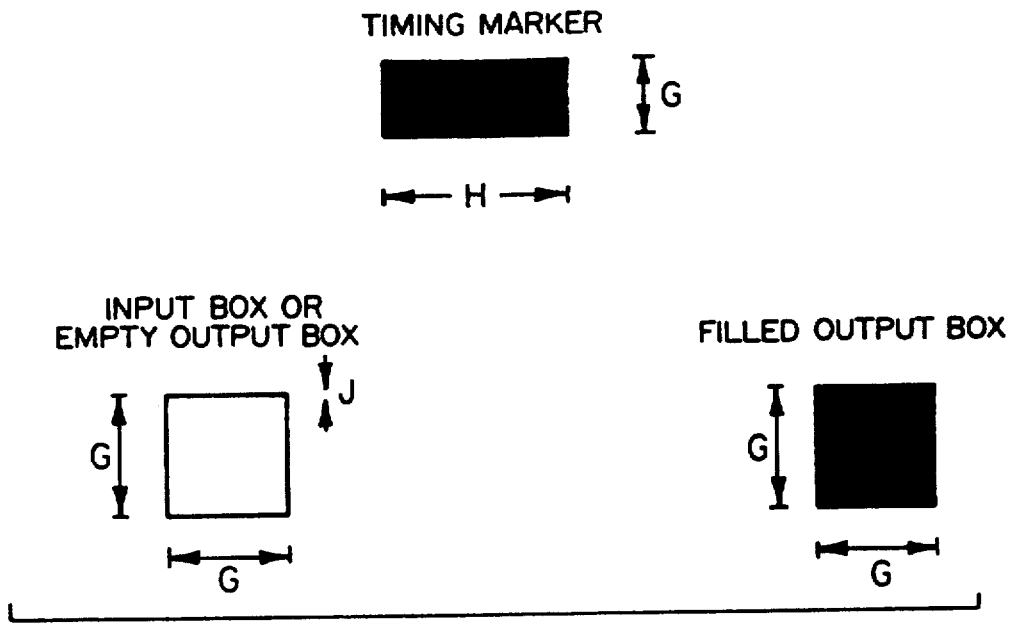
FIG. 3 is an illustration of a timing marker, an empty output box and a filled output box, all of which form part of the format on the paper form of the preferred embodiment.
Figure 4:
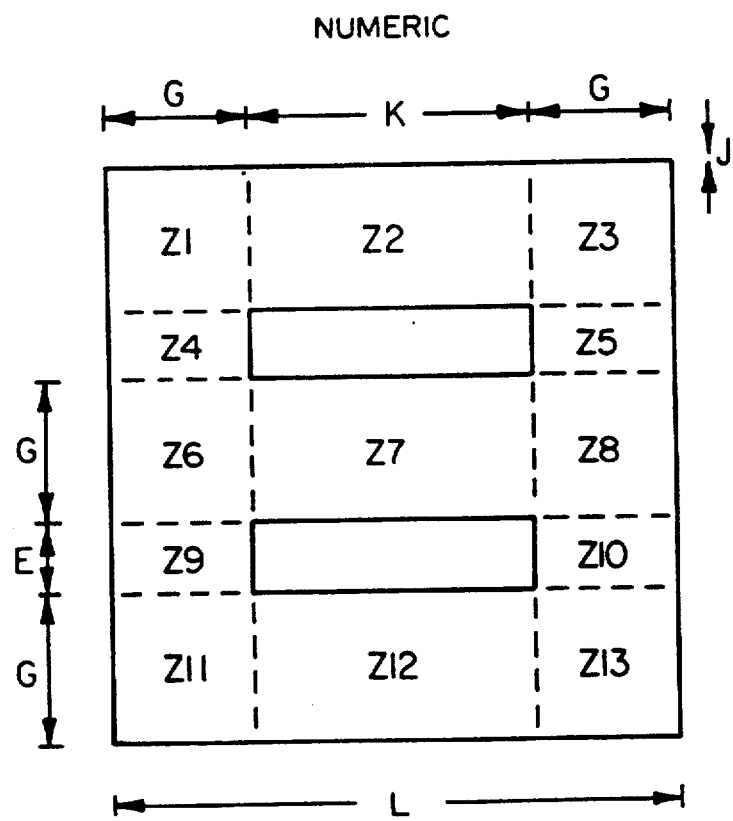
FIG. 4 is an illustration of a numeric character that forms part of the format on the paper form of the preferred embodiment.

The computer program used in the system uses a graphical standard for information storage in digital form called 'PCX/DCX'. The use of PCX/DCX format makes it possible to address areas of a memory page such that points on the page appear either as 'on' (white) or 'off' (black) squares, also known as 'pixels'. A facsimile page received through a facsimile board internal of the computer (or as an electronic output from a facsimile machine which is adjacent the computer) is stored in the memory of the computer as a grid of squares. That grid is 1728 units in width and has a length dependent on the chosen length of the paper form, i.e. 2200 units in length for a standard 8.5-inch by 11-inch form. Each square contains a value which signifies if it is black or white, and the computer program analyzes this grid to determine what information is stored on the memory page. With respect to the alphabetical lettering of dimensions shown in FIGS. 2, 3 and 4, the following values are used:

| | |
|---|---|
| A = | 1728 units |
| B = | 165 units |
| C = | 129 units |
| D = | 128 units |
| E = | 11 units |
| F = | 31 units |
| G = | 22 units |
| H = | 50 units |
| J = | 1 unit |
| K = | 44 units |
| L = | 88 units |

Each timing marker is 50 units wide and 22 units high. Each input box is 22 units wide and 22 units high on the outside and is 20 units wide and 20 units high on the inside, the lines forming the box being 1 unit wide. The left edge of the left column of timing markers is indented 129 units from the left edge of the memory page, and the right edge of the right column of timing markers is indented 128 units from the right edge of the memory page; this indentation is provided to accommodate for clipping of any paper forms that may be fed into a facsimile machine at an angle. The first and last timing markers on each memory page are spaced 165 units from the top and bottom edges of the page respectively.

Once the pictorial image on a paper form fed into a facsimile machine at a remote location has been turned into a memory page in the computer's memory using the PCX/DCX format, scanning of the memory page commences. The program searches for the first pair of timing markers 165 units from the top of the memory page. A sample 3 units by 3 units is taken, and a determination made as to what number of the 9 square units are black. If more than a threshold value (based on normal noise experienced by facsimile machines) is black, further testing is performed to see if this black area may be a timing marker. If the threshold value is not met, the program continues scanning to the right in 0.125-inch increments until 0.25 of the width of the memory page has been scanned, at which time scanning commences at the left edge of the page at a position 0.05-inches further down the page. If no black area qualifies as a timing marker in the first four inches of the memory page, further searching is aborted and a determination is reached that the paper form image cannot be processed. The program does not allow for any marking between the pair of timing markers in either row −1 or row N+2, and tolerates only light stray marking between either of those pairs of timing markers and the proximate edge of the memory page.

Once a potential timing marker has been located, the program determines the dimensions of that object and compares them to the size a timing marker should have, i.e. 50 units width and 22 units height. If the object is close to that size, within guidelines set in the program, it is accepted as the first timing marker. Scanning of the page then proceeds to identify further timing markers, which are set 11 units apart down the page. Between the second set of timing markers is the Encoded Form Number surrounded by either the Rightside Up Indicators or the Upside Down Indicators—if the latter is encountered, the program automatically recognizes that it is viewing the particular page from the bottom first, i.e. the paper form was fed upside down into the facsimile machine at the remote location.

The format described thus far is the 'general format', which is the common portion of the total format on paper forms. The program automatically generates the general format during creation of each new paper form format, and then looks for that format on the images of paper forms transmitted by telephone back to the computer; however, the specific format on each paper form varies with the needs of the user at the remote location. The space available for the specific format on each paper form, henceforth called 'the free space', is the space between the inside of the columns of timing markers in rows 1 to N; that space is 40 columns wide and up to 120 lines long.

There are 3 types of information which can appear in the free space: (i) options, (ii) specifics, and (iii) numerics, which are all shown in the sample paper form format of FIG. 5. With respect to that format, the first row of options underneath AUTOMOTIVE LISTING SERVICE are ADD, INQUIRE, DELETE and STOCK REPORT. At the time that the image for this paper form was created on the screen of the computer, the computer operator typed the four labels ADD, INQUIRE, DELETE and STOCK REPORT and drew an empty box beside each; the position of each label and associated box was then stored in a data base of the program. Similarly, under MANUFACTURER'S CODE OR MODEL NAME, an alphanumeric block was created by the computer operator for transferring alphanumeric data up to 8 characters in length. Next follow another series of options, i.e. 4 cylinders, 6 cylinders, 8 cylinders. A final area on the paper form contains numerics; a numeric is a figure-8 having its horizontal segments inline with timing markers and having its vertical segments inline with columns, as illustrated in FIG. 2. When the image for the paper form for the AUTOMOTIVE LISTING SERVICE was stored by the computer, the relative position of each of the figure-8's was retained. Once a completed copy of the paper form was received back from the remote location, the program was able to interpret filled figure-8's as numerical data.

Once the paper form image has been created by a computer operator and assigned an Encoded Form Number for storage in the computer's library and transmitted to a series of remote locations either electronically or physically (if a paper form is printed at the computer location from the image), the form is completed at each remote location and then returned by facsimile transmission to the computer. Without human intervention, the computer uses the timing markers on the memory page created from the facsimile transmission to orient itself relative to that page. The program then matches the Encoded Form Number on that memory page with the matching format in its library of stored specific formats. The program then utilizes the template of the particular stored format to interpret the information on the memory page. Variances in the separation distance of adjacent timing markers bordering the free space, caused for instance by fluctuations in the paper form feed speed into the facsimile machine at the remote location, are compensated by the program, which uses each pair of timing markers as a reference for the line of specific format stored between that pair in the template. The information interpreted from the memory page may be data which is turned into an ASCII file, or it may take the form of a command to the computer from a user of the facsimile machine at the remote location, for instance, asking the computer to send that user information on the contents of one of the computer's files. With respect to the ASCII data files produced, the computer may be programmed to periodically examine the content of those files and to use those contents to update a series of internal data bases.

As previously mentioned, the free space used for the specific format is 40 columns wide and up to 120 rows long (the number of rows depending on the length of the paper form selected). FIG. 2 (which is not to drawn to scale) shows the position of the 40 available boxes, each designated as 25, in each row, those boxes being labelled #1 to #40. The 4-boxes next to the words ADD, INQUIRE, DELETE and STOCK REPORT in FIG. 5, as well as the 36 boxes in each of the eight rows of the alphanumeric block entitled MANUFACTURER'S CODE OR MODEL NAME in FIG. 5, have positions that would correspond to some of the box positions in FIG. 2. Each box 25 has the outside dimensions of the input box shown in FIG. 3, namely, 22 units by 22 units, and the borders of each box are defined by a line 1 unit wide. Each row of boxes is in line with a pair of timing markers, and each of the outermost boxes are spaced 31 units from the adjacent timing marker; each box is spaced from each adjacent box by 11 units. The program knows the centre location of each of these boxes and examines a 15-unit by 15-unit area surrounding that centre location; if that area is more than 35% filled with black, the box is considered by the program to have been filled in. Any figure-8's created by the program for a paper form have the relative orientation relative to the box positions and timing marker positions as shown in FIG. 2—the three horizontal segments of the figure-8 are each inline with a row of the timing markers, and the vertical segments are inline with box positions once removed from each other. Up to 13 figure-8's can be positioned in a row if the spacing between each figure-8 is maintained at 11 units and the end figure-8's are positioned 31 units from the adjacent timing markers.

There are two phases involved with decoding a numeric. Firstly, the numeric is scanned to determine what shape has been filled in, and secondly, the shape is identified as a known digit or rejected as nonsense. To determine what shape has been filled in, the program examines 13 locations inside each figure-8 for lines. If a piece of a line is present, that location is flagged as being filled. The locations marked as filled are then used to determine the pattern present. As with the boxes, the first step for each figure-8 is to locate the centre of 13 zones, designated as Z1 to Z13 in FIG. 4. Zones Z1–Z3, Z6–Z8, and Z11–Z13 are treated exactly the same as for the boxes of the options and specifics. Zones Z4, Z5, Z9 and Z10 do not fall in a direct line between a pair of timing markers; in fact, those zones fall in a direct line between the spaces that separate pairs of timing markers. Thus the center of zones Z4, Z5, Z9 and Z10 is determined by averaging the 'x' and 'y' co-ordinates of the timing markers above and below those zones. For zones Z2, Z7 and Z12, the program looks vertically through each zone at three horizontally spaced locations; for each zone, if a contiguous set of white points greater than a threshold length is found in two of the spaced locations, the program concludes that no horizontal line extends through that zone. For zones Z4, Z5, Z9 and Z10 the same process is used except that the line of points tested is horizontal rather than vertical. Each of zones Z1, Z3, Z6, Z8, Z11 and Z13 are tested in a similar way, except that only two lines of points are examined in each zone—those two lines forming an 'X' crossing at the centre of the zone. Once the pattern has been determined, it is compared to a table of known patterns for the various numbers between 0 and 9. Each comparison is given a score reflecting how closely it matches the known pattern. The highest score is used to decide which digit the pattern actually represents. This method of pattern matching allows a certain amount of variance in what shapes are recognized as digits. For instance, some people add a curl to their 9's while others don't. The algorithm which performs the comparison assigns various weights to different sections of the figure-8; some pieces of numbers are more important than others. A certain correspondence threshold must be met before the program recognizes the contents of a figure-8 to be a number. If the contents may match two numbers equally well, the program will not indicate a match with either number.

Once the program has scanned the contents of the free space, it reads the Encoded Form Number and the Upside Down Indicators (Rightside Up Indicators, if the form was fed into the facsimile machine upside down) at the bottom end of the memory page. It compares that information with the Encoded Form Number and Indicators that it scanned at the top end of the memory page. If the two pieces of information do not match (because, for instance, a piece of dust has obstructed the facsimile machine's scanner), the program indicates a mismatch and sends a signal to the facsimile machine at the remote location indicating that the copy of the paper form was not properly received.

Following as a series of five appendices are the six subprograms (called 'I-Fax programs') which comprise the computer program described above. The six subprograms are: (1) Fax.H, (2) FaxDir.H, (3) FaxProc, (4) FaxDes, (5) FaxSend, and (6) Fax2Pcx. The subprogram Fax.H defines all the constants, variables, and functions needed by other subprograms. The subprogram FaxDir.H allows any of the subprograms to locate their 'home directory' which holds their .EXE and support files. Appendix A contains the source code for the subprograms Fax.H and FaxDir.H. Appendix B contains a description of the subprogram FaxProc, followed by a series of six flow charts and the source code for that subprogram. Appendix C contains a description of the subprogram FaxDes, followed by a series of five flow charts and the source code for that subprogram. Appendix D contains a description of the subprogram FaxSend, followed by a series of three flow charts and the source code for that subprogram. Appendix E contains a description of the subprogram. Appendix E contains a description of the subprogram Fax2Pcx, followed by a series of three flow charts and the source code for that subprogram.

APPENDIX A

```
/*****
******
***
***     File:    fax.h
***     Purpose: Constants, function definitions, and variables
***              needed by all I-Fax programs.
***
******
*****/ define FALSE    (0)
define TRUE     (1)

#define ESC      (27)

#define LARGEFONT   (2)    /* Stored in the 'font' field of the s_sting */
#define SMALLFONT   (1)    /* struct to denote what font the text should */
                           /* be printed in.                             */

/* Function to access the form information stored at a given row and column. */
/* (returns the one of the defines listed immediately below.)                */
#define spot(row, col) (spots[(row - 1) * 48 + col - 1])

#define BLANK       (0)    /* Stored in the 'spots' array to denote what */
```

```
#define INPUT       (-1)    /* item is located at that location on the   */
#define OUTPUT      (-2)    /* grid. Saved to form files.                */
#define DIGIT_UL    (-3)    /* - upper left corner of a digit */
#define DIGIT_1     (-4)    /* - elsewhere on the first row of a numeric */
#define DIGIT_2     (-5)    /* - second row of a numeric */
define DIGIT_3     (-6)    /* - third row of a numeric */ define OUTON       (-9)    /* Used in fax2pcx.c to denote the filled/empty */
define OUTOFF      (-10)   /* status of output spots                       */ define FILLED      (-11)   /* Used in faxscan.c to mark if input/output */
define EMPTY       (-12)   /* spots were filled as the page is scanned  */ define DIG01       (-15)   /* Used in faxproc.c simply as binary constants */
define DIG10       (-16)
#define DIG00       (-17)
#define DIG11       (-18)

#define ON          (1)     /* Constants for comparison of pixel values */
define OFF         (0)     /* of the PCX bitmaps handled.              */ struct s_string            /* Structure used to store strings to be printed on */
    {                      /* forms.                                           */
    char    row,
            col,
            dlen,  /* How many columns of grid locations the string
                      occupies */
            font,
            locale, /* Where and what kind of justification:
                        1 - 40 : Centered text.
                                  locale == column to center on
                        41 - 80 : Justified at the left.
                                  locale-40 == starting column
                        81 - 120 : Justification at the right.

locale-80 == ending column
                    */
            text[81];    /* The string itself */
    };
/*****
 ******
 ***
 ***    File:    faxdir.h
 ***    Purpose: Functions to allow the I-Fax programs to locate their
 ***             'home directory' which holds all their EXE and support
 ***             files.
 ***
 ******
 *****/ include <dir.h> find_exe_dir(char *buf, char *argv_0)
/*      char *buf: a buffer to hold the path to the home directory
        char *argv_0: argv[0] as passed to main() by the startup code
```

```
        - called at the start of all the I-Fax programs
        - looks at argv[0] to see if the program was invoked with an
          explicit path to the executable, and thus the home directory
        - if this fails, searches for the executable on the DOS PATH
*/
{
FILE    *temp;

if((temp= fopen(argv_0, "rb")) != (FILE *)NULL)
        {
        fclose(temp);
        strcpy(buf, argv_0);
        }
else
        {
        strcpy(buf, searchpath(argv_0));
        }
justpath(buf);
strupr(buf);
} justpath(char *filespec)
/*      char *filespec: A (possibly) full path to a file

- returns only the path component of a filename.
*/
{
char    *r;

r= filespec + strlen(filespec) - 1;
while (r >= filespec && *r != '\\' && *r != ':')
        r--;

*(r+1)= 0;
}
```

45

APPENDIX B

Program FaxProc

The heart of I-Fax technology is an image scanning software package called FaxProc which converts a fax image to an input recognizable by a computer, thus allowing the computer to process an incoming fax as though it were a keyboard entry. FaxProc reads the information entered by a user on the input form and creates an input record in an ASCII standard (American Standard Code for Information Interchange).

I-Fax uses a graphical standard for information storage in digital form called PCX/DCX (this format is Public Domain and is well documented). The use of the PCX/DCX format made possible to address areas of the logical page such that points on the page either appear as Black or White (On or Off).

The image recognition philosophy of I-Fax is the utilization of a geometric approach to deduce the patterns on the page. All I-Fax pages have two columns of timing markers, one running down each side of the page. FaxProc detects the timing markers on the sides of the page and using them as a reference calculates precise locations where the sensitive areas of the page are and subsequently tries to deduce whether those areas are shaded or not.

When a fax is received by the computer it is stored in memory as a grid of squares. The grid is approximately 1700 boxes wide and 2200 boxes in length for a standard 8½ x 11 inch page. Each box contains a value which signifies whether it is black or white. FaxProc processes this grid to determine what information is stored on the page.

FaxProc begins scanning the page at the leftmost edge and proceeds towards the right in search for initial timing markers. If those are found within the first 4" of the page the scanning proceeds by moving down the columns of timing markers, one at a time, examining each row of the page as it goes in search for information. Otherwise the search is aborted.

The first type of information which FaxProc can scan for is the spot. All sensitive areas lie in a precise horizontal line between the centres of two timing markers, one located in each column. All spots are spaced so their centres occur at intervals of 1/43 of the width of the distance between column centres. After locating the spot's centre a 15x15 square of pixels is examined to determine if the spot has been filled in (i.e. whether the area is more than 35% filled in with black spots).

The other type of item which FaxProc can scan for and interpret is a numeric. To determine whether the shape filled in is a known digit 13 locations inside the figure eight are checked for lines. If a piece of a line is present that location is flagged as being filled. Once the pattern has been determined it is compared to a table of known patterns for the various numbers between 0 and 9 to decide which digit the pattern actually represents or to conclude that the shape filled in should be rejected as meaningless.

Included are six flowcharts and a source code of a program FaxProc.

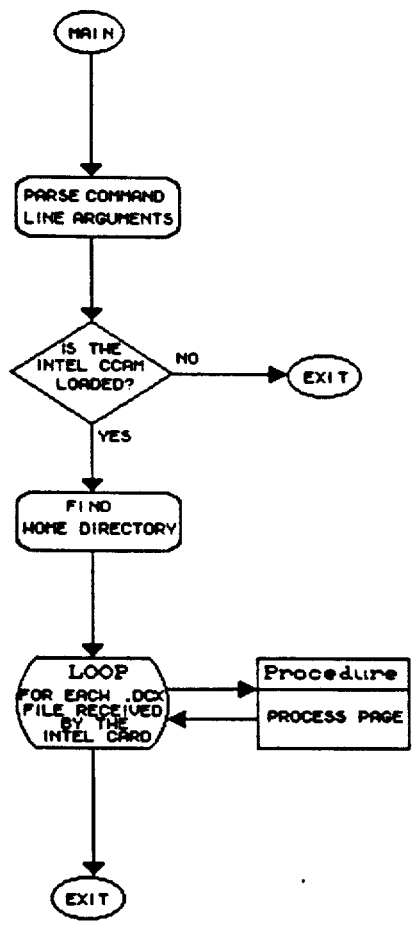

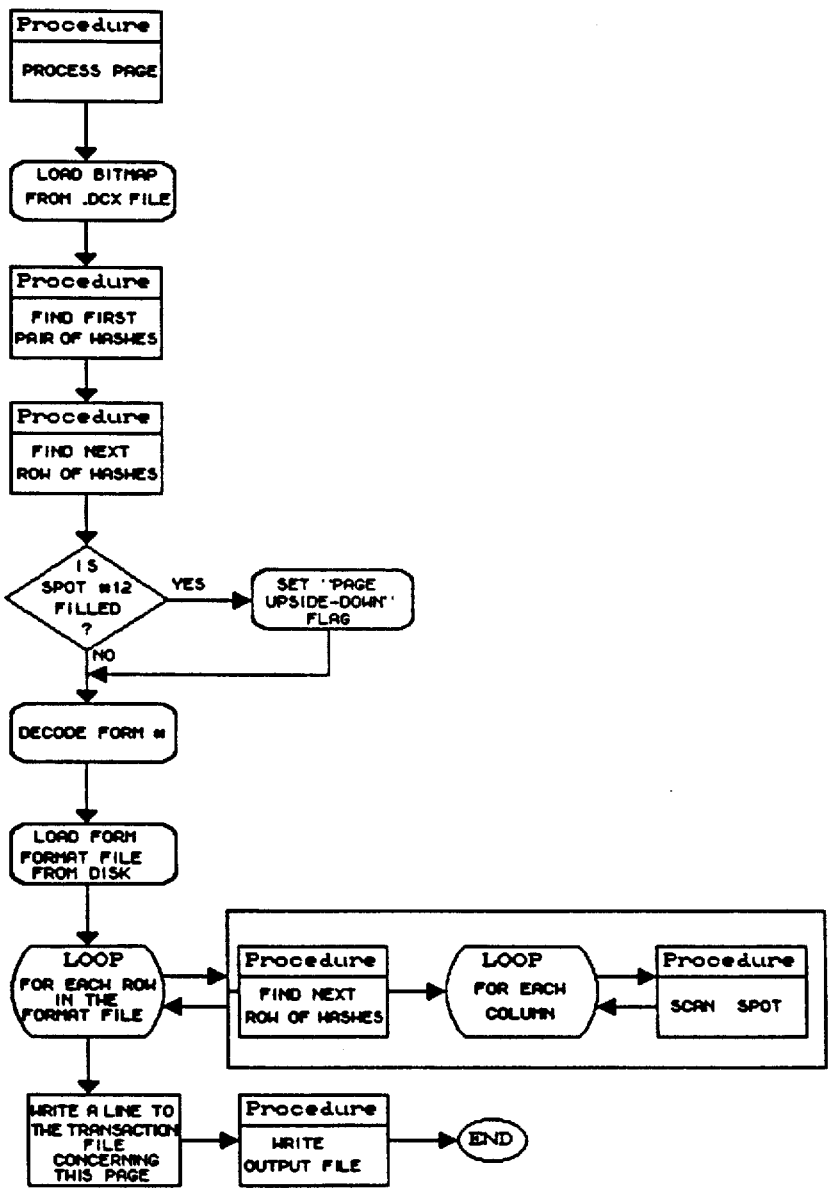

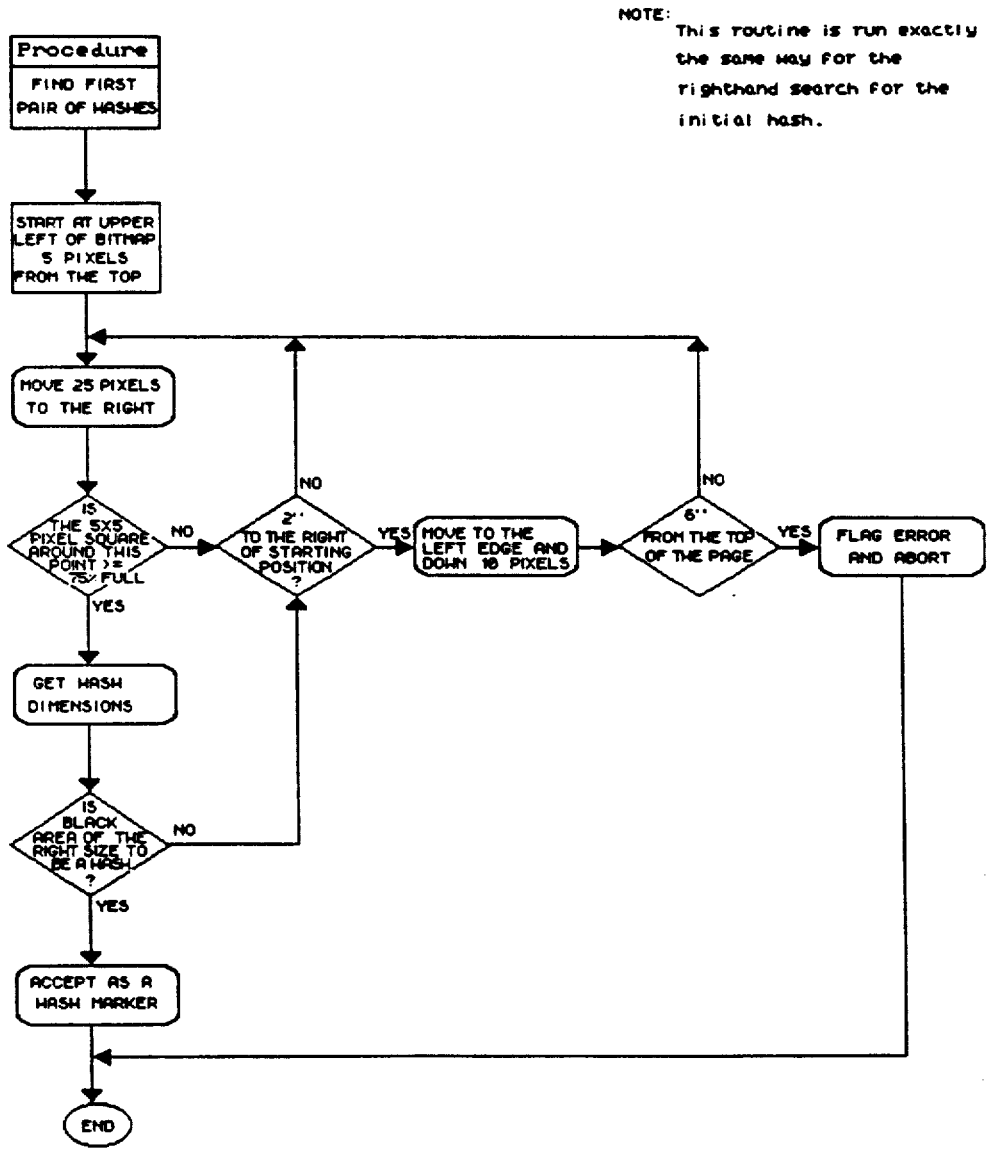

| FLOWCHART | System<br>I-Fax | Chart No.<br>4 | Page No.<br>1 |
|---|---|---|---|
| | Procedure<br>FaxProc | Author<br>E.Chwialkowska | Effective Date<br>Jan 25, 1991 |
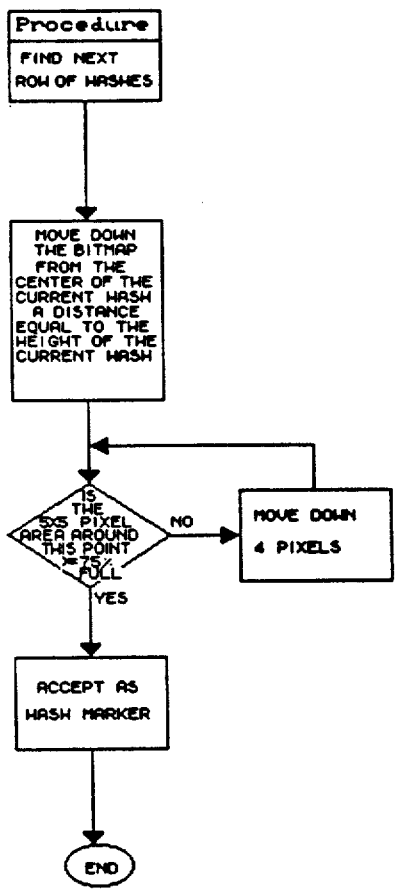

| FLOWCHART | System<br>I-Fax | Chart No.<br>5 | Page No.<br>1 |
|---|---|---|---|
| | Procedure<br>FaxProc | Author<br>E.Chwialkowska | Effective Date<br>Jan 25, 1991 |
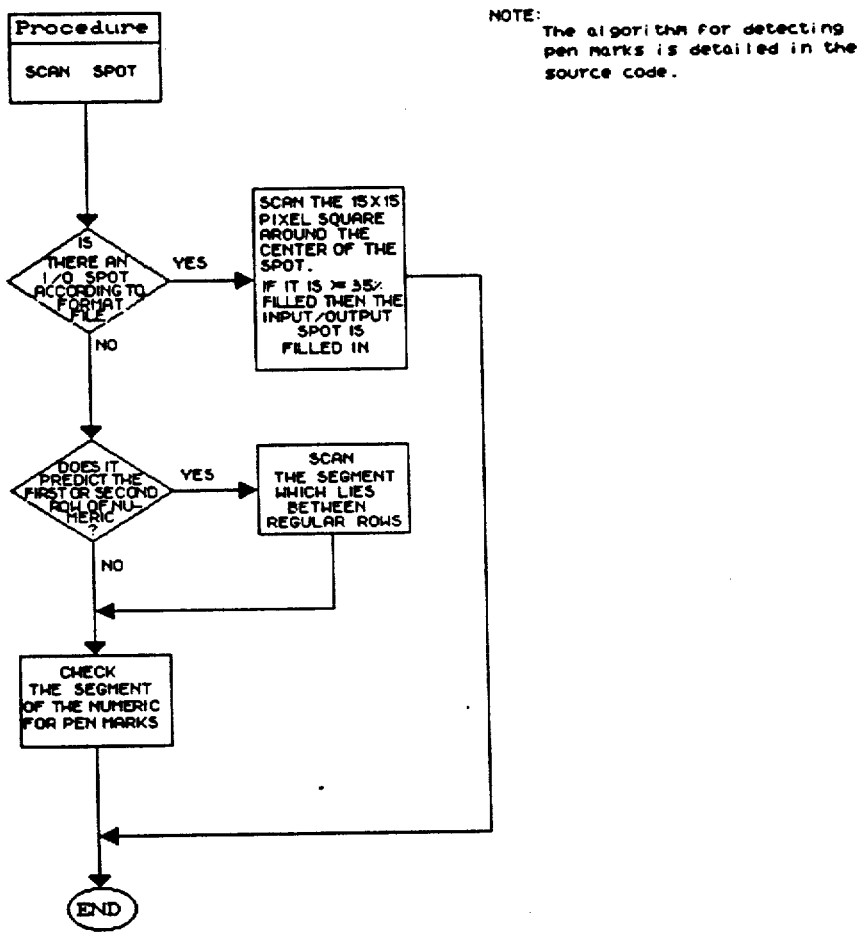
NOTE: The algorithm for detecting pen marks is detailed in the source code.

| FLOWCHART | System<br>I-Fax | Chart No.<br>6 | Page No.<br>1 |
|---|---|---|---|
| | Procedure<br>FaxProc | Author<br>E.Chwialkowska | Effective Date<br>Jan 25, 1991 |
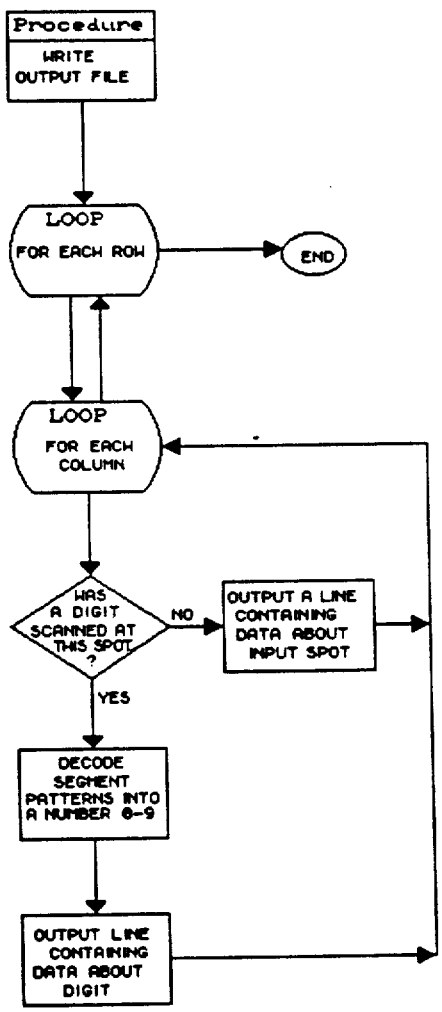
NOTE: The algorithm for decoding digits is detailed in the source code.

```
/*****
******
***
***     File:    faxproc.c
***     Purpose: Scan and interpret incoming fax pages from a bitmap
***              into processable data. Reads and processes all pages
***              in the DCX files created by the Intel Card.
***
******
*****/

/* The define below controls whether FaxProc processes incoming pages from
   the Intel card or from the file TEST.DCX; mainly for testing purposes */ define FAXCARD True include <stdio.h>
include <io.h>
#include <dos.h>
#include <fcntl.h>
#include <binary.h>
#include <time.h>
#include "fax.h"
#include "faxdir.h"

union REGS
        regs;

char    exe_dir[128];
char    d_output_template[128],       /* data file template for sprintf() */
        t_output_template[128],       /* transaction file template for sprintf() */
        dcx_output_template[128];     /* dcx copy file template for sprintf() */
char    spots[128 * 48];              /* grid for blank form data */
int     MAX_ROWS;                     /* number of rows in current form */ typedef unsigned char
        pcx_line[216];                /* bitmap line */ define PCXROWS (256)

pcx_line bitmap[PCXROWS];             /* 'Window' onto the PCX bitmap */ int     Row,
        Col;

int     lo,                           /* lower and upper bitmap rows */
        hi;                           /* currently in memory */ int     upside_down,     /* upside-down bit set on top of page? */
        upside_down2,    /*      "       "   "   "  bottom of page? */
        form,            /* form number found at top of page */
        form2,           /*  "     "       "    "  bottom of page */
        page_error,      /* error found during processing flag */
        ttl_pages;       /* number of pages processed in this execution */ char    page_error_str[80];   /* error description */
```

```
int file_handle;

struct hash_s       /* data on hashes */
        {
        int     r,      /* row and column (pixel) location of the approximate center */
                c,
                rows,   /* width and height in pixels */
                cols;
        }       left,   /* left and right hash markers */
                right,
                half_left,      /* the midpoint between the current hash */
                half_right;     /* and the previous or next hash, depending
                                   on whether the page is upside right
                                   or upside down (respectively). */ long    count;  /* running index count of documents processed since install */ struct  dcxs_s
        {
        dcx_filename[80];       /* structure to hold the name of the DCX file */
        } dcxs;

/* This define causes the percent parameter (p) to be turned into an actual
   integer number representing a threshold number of pixels (based on the area)
   at COMPILE time rather than run time since this
   function is used so frequently. */ define ness(s,r,c,dr,dc,p) realness(s,r,c,dr,dc, p*(2*dr + 1)*(2*dc + 1)/100)

/*      A spot is located on the page by traversing (n/43) of the verticle
        and horizontal distances between the pair of hashes which lie
        on the left and right of the row (where n is the number of the
        input box + 1). The input boxes are numbered 1 - 40
        (there can be 40 boxes on a row) across the row.
        Boxes are placed 2/43, 3/43, 4/43, ..., and 41/43 of the way
        horizontally between the left and right hashes when the form
        is printed. They are perfectly aligned vertically at printing time.
        35% threshold of 'filled-in'ness signifies a user-filled box. */ define check_spot(which) (ness(ON,\
 (int)((double)left.r + (double)(which + 1) / 43 * ((double)right.r - (double)left.r) + 0.5),\
 (int)((double)left.c + (double)(which + 1) / 43 * ((double)right.c - (double)left.c) + 0.5),\
 7, 7, 35))

#define MODE_F  (1)     /* used to determine which mode fax_roc was invoked in */
#define MODE_O  (2)
#define MODE_PO (3)
#define MODE_PA (4)
#define MODE_T  (5)

/*****
         ******
         ***
         ***    Level 1.
         ***
         ******
         *****/
```

```
main(int argc, char **argv)
{
long
        run_time,
        start_time,
  get_count();
char    mode;
#ifdef FAXCARD
unsigned int
        event_handle;
endif start_time= time(0);
printf("Fax Processor        (c) Copyright 1990 by Worthington\n");
printf("                Software Company, All Rights Reserved.\n\n");

argc--;

if (argc != 3)
        {
        printf("Usage:\n");
        printf("       FAXPROC [d:]output_path .ext mode\n\n");
        printf("* '[d:]output_path' is the directory name to place output files produced when\n");
        printf("  an incoming fax is processed.\n");
        printf("* '.ext' is the 4 characters to append to the path and filename of output\n");
        printf("  files. (A period must be included.)\n");
        printf("* 'mode' controlls when FaxProcessor exits back to DOS:\n");
        printf("    F: continue operation FOREVER (until Esc is pressed)\n");
        printf("    O: wait until ONE transmission has been processed, then exit\n");
        printf("    PO: process ONE of any PENDING (already received) transmissions then exit;\n");
        printf("        if there are no pending pages, then exit with an errorlevel of 3\n");
        printf("    PA: process ALL PENDING (already received) transmissions then exit; if\n");
        printf("        there are no pending transmissions, then exit with an errorlevel of 3\n");
        printf("    #: by placing a number on the command line you specify the number of\n");
        printf("        seconds to remain operative before exitting (can be 1 - 2.1 x 10^9)\n\n");
        done(1);
        }

/* Construction of the output templates for use with sprintf() */ strcpy(d_output_template, argv[1]);
if(d_output_template[strlen(d_output_template)-1] != '\\')
        strcat(d_output_template, "\\");
strcpy(t_output_template  d_output_template);
strcpy(dcx_output_template, d_output_template);
strcat(d_output_template, "%05li%03i");
strcat(t_output_template, "T%05li");
strcat(dcx_output_template, "%05li.DCX");

/* Checking of the command line arguments. */ if(strlen(argv[2]) > 4)
        {
        printf("The extension must be 4 characters or less, including the period. (%s)\n", argv[2]);
        done(1);
        }
if(argv[2][0] != '.')
        {
```

```c
            printf("The extension must include a leading period. (%s)\n", argv[2]);
            done(1);
        }
strcat(d_output_template, argv[2]);
strcat(t_output_template, argv[2]);

/* Determining what mode faxproc was invoked in. */ strupr(argv[3]);
switch(argv[3][0])
    {
    case 'F':       /* Forever */
            mode= MODE_F;
            break;
    case 'O':       /* One */
            mode= MODE_O;
            break;
    case 'P':       /* Pending... */
   switch(argv[3][1])
     {
                case 'A':       /* ... All */
                mode= MODE_PA;
                break;
                case 'O':       /* ... One */
                mode= MODE_PO;
                break;
        default:
                printf("Illegal mode specified. (%s)\n", argv[3]);
        done(1);
                break;
     }
   break;
    case '0':       /* Time in seconds */
    case '1':
    case '2':
    case '3':
    case '4':
    case '5':
    case '6':
    case '7':
    case '8':
    case '9':
            mode= MODE_T;
            run_time= atol(argv[3]);
            break;
    default:
            printf("Illegal mode specified. (%s)\n", argv[3]);
   done(1);
            break;
    } ifdef FAXCARD

/* Checking for the presence of the Intel Connection Coprocessor Application
    Manager (CCAM). */
```

```
regs.h.ah= 0xCB;
regs.h.al= 0x00;
int86(0x2F, ®s, ®s);
if(regs.h.al != 0xFF)
        {
        printf("Intel Connection Coprocessor Resident Manager not installed; operation aborted.\n");
        done(1);
        }
endif
find_exe_dir(exe_dir, argv[0]);        /* Find home directory */ ttl_pages= 0;
/* Start waiting for documents to process. */
while (1)
        {
        int     page;
        long    offset;

regs.x.ax= 1;
        /* While there are no pages to process, kill time. */
        while(regs.x.ax != 0)
                {
                /* Time to exit? */
                if(mode == MODE_T && time(0) - start_time > run_time)
                        done(0);

/* Key hit? */
                if(kbhit())
                        {
                        if(getch() == ESC)
        {
        printf("Esc pressed; shutting down.\n");
                                done(0);
        }
#ifndef FAXCARD
                        file_handle= _open("test.dcx", O_RDONLY);
                        regs.x.ax= 0;
#endif
                        }
ifdef FAXCARD
                /* Search Intel queue for document to process. */
                regs.h.ah= 0xCB;
                regs.h.al= 0x05;
                regs.x.cx= 0;
                regs.h.dh= 0;
                regs.h.dl= 1;
                int86(0x2F, ®s, ®s);
                if(regs.x.ax == 0)
                        {
                        int     eoq;

event_handle= regs.x.bx;

regs.h.ah= 0xCB;
                        regs.h.al= 0x07;
                        regs.x.bx= event_handle;
                        regs.x.cx= 1;
```

```
                    regs.h.dl= 1;
                    int86(0x2F, ®s, ®s);

eoq= FALSE;
                    while(regs.x.ax != 0 && !eoq)
                            {
                            regs.h.ah= 0xCB;
                            regs.h.al= 0x06;
                            regs.h.dl= 1;
                            int86(0x2F, ®s, ®s);
                            event_handle= regs.x.bx;

eoq= (regs.x.ax != 0);
                            if(!eoq)
                            {
                            regs.h.ah= 0xCB;
                            regs.h.al= 0x07;
                            regs.x.bx= event_handle;
                            regs.x.cx= 1;
                            regs.h.dl= 1;
                            int86(0x2F, ®s, ®s);
                            }
                            } if(!eoq)
                        file_handle= regs.x.bx;
                }
endif
            /* Are there any pending pages? */
            if(regs.x.ax != 0 && ttl_pages == 0 && (mode == MODE_PO ||
                                                   mode == MODE_PA))
                    {
                    printf("No pending pages to process.\n");
                    done(3);
                    }

/* Have we run out of pending pages? */
            if(regs.x.ax != 0 && ttl_pages > 0 && mode == MODE_PA)
                    done(0);
            }
    /* Obtain a new sequence number. */
    count= get_count();

page= 0;

/* Find the offset of page 1 in the DCX file. */
    lseek(file_handle, (long)(page * 4 + 4), SEEK_SET);
    _read(file_handle, &offset, 4);
    while(offset > 0)    /* WHILE loop as long as there are more pages to process. */
            {
            ttl_pages++;
            /* Go to the start of the first page's PCX format */
            lseek(file_handle, offset, SEEK_SET);

load_initial_pcx();    /* ... and associated form format file */
```

```c
/* Process all the rows and columns as found in the form format
   file. */
for(Row= 1; Row <= MAX_ROWS && !page_error; Row++)
        {
        for(Col= 1; Col <= 48; Col++)
                {
                int     rel_row,
                        rel_col;

/* Handle upside down pages, so we know where
                   on the form format grid we really are. */
                rel_row= (upside_down ? MAX_ROWS + 1 - Row : Row);
                rel_col= (upside_down ? 41 - Col : Col);

printf("Page %02i Row %03i Col %02i\r", page + 1, rel_row, rel_col);

/* What should be here on the page? */
                switch(spot(rel_row, rel_col))
                        {
                        case BLANK:     /* Nothing, skip it */
                                break;
case INPUT:
case OUTPUT:    /* A spot, scan it */
        spot(rel_row, rel_col)= (check_spot(Col) ? FILLED : EMPTY);
        break;
case DIGIT_UL:  /* A digit, scan it */
case DIGIT_1:   /* (fisrt or second row */
case DIGIT_2:   /* but not third) */
        /* Scan the piece which actually falls on this row
           on left side corner [check_digit] and the
           piece which is between hashes on the left
           [check2digit] */
        switch((check2digit(Col) << 1) + check_digit(Col, 1))
                {
                /* Encode the result and save it back
                   in the form grid. */
                case 00:
                        spot(rel_row, rel_col)= DIG00;
                        break;
                case 01:
                        spot(rel_row, rel_col)= DIG01;
                        break;
                case 3:
                        spot(rel_row, rel_col)= DIG11;
                        break;
                case 2:
                        spot(rel_row, rel_col)= DIG10;
                        break;
                }

/* Check the middle of the digit */
        rel_col= (upside_down ? 41 - Col - 1 : Col + 1);
        if (check_digit(Col+1, 2))
                spot(rel_row, rel_col)= DIG01;
        else
                spot(rel_row, rel_col)= DIG00;
        rel_col= (upside_down ? 41 - Col - 2 : Col + 2);
```

```c
            /* Same as before, except for the
               two pieces on the right */
            switch((check2digit(Col+2) << 1) + check_digit(Col+2, 3))
                  {
                  case 00:
                        spot(rel_row, rel_col)= DIG00;
                        break;
                  case 01:
                        spot(rel_row, rel_col)= DIG01;
                        break;
                  case 3:
                        spot(rel_row, rel_col)= DIG11;
                        break;
                  case 2:
                        spot(rel_row, rel_col)= DIG10;
                        break;
                  }
            Col+= 2;
            break;

/* For the 3rd row there are no 'halfway
      between hash mark' pieces to scan */
   case DIGIT_3:
         /* Left */
         spot(rel_row, rel_col)= (check_digit(Col, 1) ? DIG01 : DIG00);

/* Middle */
                                    rel_col= (upside_down ? 41 - Col - 1 : Col + 1);
                                    spot(rel_row, rel_col)= (check_digit(Col+1, 2) ? DIG01 : DIG00);

/* Right */
                                    rel_col= (upside_down ? 41 - Col - 2 : Col + 2);
                                    spot(rel_row, rel_col)= (check_digit(Col+2, 3) ? DIG01 : DIG00);
                                    Col+= 2;
                                    break;
                              }
                        }
                  /* If there hasn't been an irreperable error, find the
                     next pair of hashes and start scanning the next row */
                  if(!page_error)
                        find_next_row(FALSE);
                  } if(!page_error)
                  {
                  read_tail();    /* Read the duplicate information
                                     stored at the bottom of the form
                                     (form# and upside down info). */
                  }
            else                  /* Can't do that, so fake it */
                  {
                  form2= form;
                  upside_down2= !upside_down;
                  } ifdef FAXCARD
```

```
            /* Open the Fax Control File (FCF) to obtain needed information
               when we produce the transaction file. */
            regs.h.ah= 0xCB;
            regs.h.al= 0xD7;
            regs.x.bx= event_handle;
            regs.x.cx= 0;
            regs.h.dl= 1;
            int86(0x2F, ®s, ®s);
            if(regs.x.ax != 0)
                    {
                    printf("Resident Manager Error on function D7H. (%i)\n", regs.x.ax);
                    done(2);
                    }
endif
            page++;
            sprintf(dcxs.dcx_filename, dcx_output_template, count);
            /* Add a line to the transaction file for this document. */
            print_trans(regs.x.bx, page);
#ifdef FAXCARD
            _close(regs.x.bx);
endif /* Produce the output file with the data from this page. */
            print_output(page);

/* Find out the offset of the next page. */
            lseek(file_handle, (long)(page * 4 + 4), SEEK_SET);
            _read(file_handle, &offset, 4);
            printf("\n");
            }

_close(file_handle);
#ifdef FAXCARD
            /* Move the DCX file to the output directory. */
            regs.h.ah= 0xCB;
            regs.h.al= 0x14;
            regs.x.bx= event_handle;
            regs.x.cx= 1;
            regs.x.dx= (unsigned int)((unsigned long)&dcxs & 0xFFFF);;
            int86(0x2F, ®s, ®s);
endif if(mode == MODE_PO || mode == MODE_O)
                    done(0);
            }
    }

/*****
             *****
             ***
             ***    Level 2.
             ***
             *****
             *****/
```

```
struct pcx_header_s
    {
    char    id,
            version,
            encode,
            bpp;
    int     x1,
            y1,
            x2,
            y2,
            hres,
            vres;
    char    palette[48],
            reserved,
            nplanes;
    int     bpl;
    char    __unused[60];
    } pcx_header;

load_initial_pcx()
/*      Reads in the first windowful of the PCX, finds the intial hash
        markers to get bearings, reads the upside down status and
        form number from the page, and loads the blank form description
        file from the disk into memory.
*/
{
int     x;
char    form_filename[128];
FILE    *form_file;

/* Initialize everything. */
page_error= upside_down= form= Row= Col= lo= upside_down2= form2= 0;
strcpy(page_error_str, "");

/* Load the PCX header. */
_read(file_handle, &pcx_header, sizeof(struct pcx_header_s));
if(pcx_header.id != 0x0A)
        {
        page_err("Error in PCX header.");
        return;
        }

/* Initialize the windowing mechanism and load the first windowful
   of PCX file. */
read_pcx_line(-1);
for(hi= 0; hi < PCXROWS; hi++)
        read_pcx_line(hi);
hi--;

/* Locate the initial hash marks. */
find_first_hash(0, &left);
find_first_hash(1328, &right);

if(page_error)
        return;
```

```c
/* Initialize the row finding mechanism and find the next pair of hashes. */
find_next_row(TRUE);

/* Read the upside down flag from the page. */
upside_down= check_spot(12);

/* Decode the form number from the page. */
form= 0;
for(x= 0; x < 16; x++)
        {
        form= form << 1;
        if(check_spot(x + 13))
                form|= 1;
        }

/* Find the next row (ie. the first row of the user-designed form). */
find_next_row(FALSE);

/* Load the format file for the form. */
sprintf(form_filename, "%s%041.FRM", exe_dir, form);
if((form_file= fopen(form_filename, "rb")) == (FILE *)NULL)
        {
        sprintf(form_filename, "Unable to open form file. (%041.FRM)", form);
        page_err(form_filename);
        return;
        } fread(&MAX_ROWS, sizeof(int), 1, form_file);
fread(spots, MAX_ROWS * 40, 1, form_file);
fclose(form_file);
return;
}
read_tail()
/*      Reads the duplicate information stored on the bottom of the
        form regarding upside down status and form number.
*/
{
int     x;

upside_down2= check_spot(12);

form2= 0;
for(x= 0; x < 16; x++)
        {
        form2= form2 << 1;
        if(check_spot(28 - x))
                form2|= 1;
        }
} print_output(int page)
/*      int page:       The page number (used in creating the filename).

Goes through the form format grid from top to bottom, left to
                right, determines what was sucessfully obtained from the
``` page, and then produces the output file containing that data in the
following format (for each line):
        row,col,digit
where:
        row is the form row number (1-??)
        col is the form column number (1-40)
        digit is:
                13 if FALSE spot,
                12 if TRUE spot,
                11 if unknown digit in a numeric,
                10 if a numeric left empty,
                0 - 9 if a filled-in numeric
*/
{
FILE    *f;
char    filename[128];
int     r,
        c;

/* Open the output file. */
sprintf(filename, d_output_template, count, page);
if((f= fopen(filename, "wt")) == (FILE *)NULL)
        {
        printf("Unable to open output file. (%s)\n", filename);
        done(1);
        }

/* Produce one output line per item scanned on the page. */
for(r= 1; r < MAX_ROWS; r++)
        {
        for(c= 1; c <= 40; c++)
                {
                int     digit;

switch(spot(r, c))
                        {
                        case FILLED:
                                fprintf(f, "%i,%i,12\n", r, c);
                                break;
                        case EMPTY:
                                fprintf(f, "%i,%i,13\n", r, c);
                                break;
                        case DIG00:
                        case DIG01:
                        case DIG11:
                        case DIG10:
                                digit= decode_digit(r, c);
                                if(digit != -3)
                                        fprintf(f, "%i,%i,%i\n", r, c, digit);
                                break;
                        }
                }
        }
fclose(f);
}

```
long get_count()
/*      Returns a long integer which is a unique sequence number identifying
        how many documents have been processed since the system was
        installed.
        Is used in creating unique filenames.
*/
{
FILE    *f;
char    filename[128];
long    count;

/* Try and load the number from OUTCOUT.DAT in the home directory. */
sprintf(filename, "%sOUTCOUNT.DAT", exe_dir);
if((f= fopen(filename, "rb")) == (FILE *)NULL)
        {
        printf("Initializing output counter data file. (%s)\n", filename);
        count= 0;
        }
else
        {
        fread(&count, sizeof(long), 1, f);
        fclose(f);
        count= (count + 1)%1000000; /* Increment the counter, with rollover. */
        } if((f= fopen(filename, "wb")) == (FILE *)NULL)
        {
        printf("Unable to open output counter data file. (%s)\n", filename);
        done(1);
        }

/* Save the new count back to the file. */
fwrite(&count, sizeof(long), 1, f);
fclose(f);

return(count);
} struct faxcb_s
        {
        char    type,
                tran_type;
        int     status,
                time,
                date,
                num_files,
                file_off;
        char    phone[47],
                appl_tag[64],
                reserved,
                c_seconds,
                c_minutes,
                c_hours,
```

```
            reserved1[16],
            coverpage,
            reserved2[245];
    } faxcb;      /* Data structure of the Fax Control Block created
                     by the Intel Card when documents
                     are received. */ print_trans(int fhandle, int page)
/*      int fhandle:    The DOS file handle of the Intel-created FCF.
        int page:       The page number just scanned.

Adds a line to the transaction file containing information
                about the time, date, names of related files, etc. concerning
                the processing of the page.
*/
{
FILE    *tfile;
char    filename[128];
int     year,
        month,
        day,
        hour,
        min,
        sec;
#ifdef FAXCARD
unsigned int
        time,
        date;

/* Read the FCF. */
_read(fhandle, &faxcb, sizeof(struct faxcb_s));
#endif

/* Open the transaction file. */
sprintf(filename, t_output_template, count);
if((tfile= fopen(filename, "at")) == (FILE *)NULL)
        {
        printf("Unable to open output file. (%s)\n", filename);
        done(1);
        }
sprintf(filename, d_output_template, count, page);

/* Obtain time and date information. */
time= faxcb.time;
date= faxcb.date;

sec= 2 * (time >> 11);
min= (time >> 5) & 0x3F;
hour= time & 0x1F;

day= date >> 11;
month= (date >> 7) & 0x0F;
year= 1980 + (date & 0x7F);
```

```
/* Write out a transaction line. */
fprintf(tfile, "%11,%1,\"%s\",\"%s\",%1%021%021,\"%021:%021:%021\",\"%021:%021:%021\",%1,%s,%1,%s,\"%s\"\n",
        count, form, filename, dcxs.dcx_filename, year, month, day, hour, min, sec,
        faxcb.c_hours, faxcb.c_minutes, faxcb.c_seconds, page,
        (page_error ? "F" : "T"),
        Row - 1, (form != form2 || upside_down == upside_down2 ? "T" : "F"),
        page_error_str);

fclose(tfile);
} check2digit(int which)
/*      int which:      What form column to find the digit at.

hash     figure 8         hash
              marks    (numeric) . . .  marks
                |         |               |
                V         V               V

****     _____            ****
                       |  _  |  . . .
                       |X|_|X|
              ****     |  _  |  . . .    ****
                       |X|_|X|
              ****     |_____|           ****

- This function is used to scan the areas marked in the above
          diagram with the Xs. Those areas which do not lie in a direct
          line between a left and right hash pair. Rather, they lie in a
          direct line between the exact centers of the white space which
          vertically seperate the hashs in the columns.
        - It locates the centers of these locations in the exact same
          fashion as is used in the check_spot() routine described at
          the top of this file, save that the center's of the whitespace
          are used as the reference points instead of the centers of
          the hash marks.
        - Once the center has been located three tests are performed; if at
          least 2 out of the 3 tests agree that the section has a pen
          stroke going through it then TRUE is returned. Otherwise, FALSE.
        - The test is as follows:
                1] Move 11 pixels to the left of center.
                2] Walk to the right looking at the pixels as they are passed.
                3] If 16 pixels in a row are blank (white) then there is no
                        line through this section of figure-8.
          Step [3] actually tests each pixel to see if _IT_, THE PIXEL TO THE
          _LEFT_ OF IT, OR THE PIXEL TO THE _RIGHT_ OF IT are empty. This
          allows for stray noise on the bitmap due to scanning.
        - This test is performed 3 times. Once on a horizontal line directly
          across the (predicted) center of the box, once 2 pixels above
          the center, and once 2 pixels below the center. */
{
int     r,
        cstart,
        rstart,
        c,
        cur_light,
```

```
            succ,
            succ_cnt;

rstart= (int)((double)half_left.r + (double)(which + 1) / 43 * ((double)half_right.r - (double)half_left.r) + 0.5);
cstart= (int)((double)half_left.c + (double)(which + 1) / 43 * ((double)half_right.c - (double)half_left.c) + 0.5) - 11;

succ_cnt= 0;
for(r= rstart - 2; r <= rstart + 2 && succ_cnt < 2; r+= 2)
        {
        succ= FALSE;
        cur_light= 0;
        for(c= cstart; c <= cstart + 22 && !succ; c++)
                {
                if(bit(r, c) + bit(r + 1, c) + bit(r - 1, c) <= 1)
                        cur_light++;
                else
                        cur_light= 0;
                if (cur_light >= 16)
                        succ= TRUE;
                }
        if (!succ)
                succ_cnt++;
        }
if (succ_cnt < 2)
        {
        return FALSE;
        }
else
        {
        return TRUE;
        }
} check_digit(int which, int seg)
/*      int which:      What form column to to find the digit segment at.
        int seg:        1, 2, or 3 signifying what segment of the digit is
                        to be scanned (allows distinction between corners
                        and middle pieces).

hash    figure 8        hash
        marks   (numeric) . . . marks
          |        |              |
          |        |              |
          v        v              v

****    |1 2 3|  . . .   ****
                | |_| |
        ****    |1 2 3|  . . .   ****
                | |_| |
        ****    |1_2_3|          ****

- This function performs a similar function to check2digit(), except
          it scans different segments of the figure-8. The 'seg' parameter
          informs this function which kind of a segment will be scanned.
          Segments 1 and 3 are scanned differently than segment 2.
        - Segment 2 is scanned in an almost identical fashion to the scanning
``` of the segments in check2digit() except the scanning is done
in a verticle line and the scans are staggered 3 pixels to the
left and right of center.
- Segments 1 and 3 are scanned in a cross pattern. Upper-left to
lower-right and then another scan is performed lower-left to
upper right. If either return the presence of a mark, TRUE is
returned. Otherwise, FALSE. */

```c
{
int     rstart,
        cstart,
        r,
        c,
        succ,
        succ_cnt,
        cur_light;

rstart= (int)((double)left.r + (double)(which + 1) / 43 * ((double)right.r - (double)left.r) + 0.5);
cstart= (int)((double)left.c + (double)(which + 1) / 43 * ((double)right.c - (double)left.c) + 0.5);

if (seg == 2)
        {
        succ_cnt= 0;
        for(c= cstart - 3; c <= cstart + 3 && succ_cnt < 2; c+= 3)
                {
                succ= FALSE;
                cur_light= 0;
                for(r= rstart - 12; r <= rstart + 12 && !succ; r++)
                        {
                        if(bit(r, c) + bit(r, c + 1) + bit(r, c - 1) <= 1)
                                cur_light++;
                        else
                                cur_light= 0;
                        if (cur_light >= 16)
                                succ= TRUE;
                        }
                if (!succ)
                        succ_cnt++;
                }
        if (succ_cnt < 2)
                {
                return FALSE;
                }
        else
                {
                return TRUE;
                }
        }
else
        {
        succ= TRUE;
        cur_light= 0;
        for(r= rstart - 11, c= cstart - 11; r <= rstart + 11 && succ; r++, c++)
                {
                if(bit(r, c) + bit(r + 1, c) + bit(r, c + 1) <= 1)
                        cur_light++;
```

```
                else
                        cur_light= 0;
                if (cur_light >= 16)
                        {
                        succ= FALSE;
                        }
                }
        cur_light= 0;
        for(r= rstart + 11, c= cstart - 11; r >= rstart - 11; r--; c++)
                {
                if(bit(r, c) + bit(r - 1, c) + bit(r, c + 1) <= 1)
                        cur_light++;
                else
                        cur_light= 0;
                if (cur_light >= 16)
                        {
                        return succ;
                        }
                }
        }
return TRUE;
}

/*****
******
***
***     Level 3.
***
******
*****/ find_first_hash(int scol, struct hash_s *h)
/*      int scol:       Pixel column to start scan at.
        struct hash_s *h:       The hash struct in which to store the
                                locations of hashes and other info.

- This function is used to search the top of the page for the
          initial pair of hash markers. Once these are located another
          function is used to move down each column from hash to hash.
        - The algorithm is as follows:
                [1] Start 1/4" from the top of the page (to ignore "To:",
                    "From:" and other messages placed on the page
                    by the fax machine).
                [2] Scan left to right in 25 pixel steps*, after traversing
                    400 pixels of width (2") drop down 10 pixels and
                    move to the 'scol' and repeat step [2].
              * [3] At each step a 5-pixel by 5-pixel box centered on the
                    current pixel is checked to see if it is at least 75% full
                    of black pixels.
                [4] If it is, get_hash_info() is called to find its
                    size. If the size falls within the reasonable size of
``` a hash it is accepted and the search terminates, the proper information placed in struct hash_s *h. Otherwise the search continues for 6" down the page. If no proper hash is found a page_err() is generated. */

```
{
int     r,
        c;

for(r= lo + 50; r < 1200 && !page_error; r+= 10)
        {
        for(c= scol + 5; c < scol + 400 && !page_error; c+= 25)
                {
                if(ness(ON, r, c, 2, 2, 75))
                        {
                        h->r= r;
                        h->c= c;
                        get_hash_info(h);
                        if(h->rows >= 12 && h->rows <= 33 &&
                           h->cols >= 38 && h->cols <= 64)

{
                                get_hash_info(h);
                                if(h->rows >= 12 && h->rows <= 33 &&
                                   h->cols >= 38 && h->cols <= 64)
                                        return;
                                }
                        }
                }
        } page_err("Could not locate initial alignment markers.");
} decode_digit(int s_row, int s_col)
/*      int s_row:      Starting form row of the digit.
        int s_col:      Starting form col of the digit.

- This function examines the patterns of filled or non-filled
          segments produced by check_digit() and check2digit() and tries
          to match them to a number from 0 to 9.
        - Numbers are compared to predetermined patterns and are scored
          on how closely they match. The number corresponding to the highest
          score is returned as long as it matches within a certain tolerance
          and there are no other matches that are close enough to constitute
          a virtual tie. */
{
int     r,
        c,
        digit,
        bin_digit,
        numerics,
        best,
        digits[]=
                {
/*
```

```
+--------+
|00 01 02|   If a spot is filled in for a given pattern it's
| +--+   |   binary pattern has the bit representing 2^XX set;
|03|  |04|   where XX is the number which appears in the diagram
| +--+   |   to the left.
|05 06 07|
| +--+   |
|08|  |09|
| +--+   |
|10 11 12|
+--------+

NUMBER, BINARY PATTERN */
            1, (BIN00010010 << 8) + BIN10010100, /* On the left */
            1, (BIN00000101 << 8) + BIN00101001, /* On the right */
            2, (BIN00011101 << 8) + BIN11110111,
            3, (BIN00011101 << 8) + BIN11101111,
            4, (BIN00010111 << 8) + BIN11101001,
            5, (BIN00011110 << 8) + BIN11101111,
            6, (BIN00011110 << 8) + BIN11111111, /* With a hook on top */
            6, (BIN00010010 << 8) + BIN11111111, /* Without a hook */
            7, (BIN00011101 << 8) + BIN00101001,
            8, (BIN00011111 << 8) + BIN11111111,
            9, (BIN00011111 << 8) + BIN11101001, /* Without a hook on the bottom */
            9, (BIN00011111 << 8) + BIN11101111, /* With a hook on the bottom */
            0, (BIN00011111 << 8) + BIN10111111,
           10, (BIN00000000 << 8) + BIN00000000  /* BLANK numeric */
            };

/* If the digit extends below the last row we successfully scanned, abort. */
if(s_row + 2 >= Row)
        return(-3);

/* Construct a binary pattern for the scanned numeric. */
bin_digit= 0;
for(r= s_row; r < s_row + 3; r++)
        {
        for(c= s_col; c < s_col + 3; c++)
                {
                bin_digit= bin_digit << 1;
                if(spot(r, c) == DIG01 || spot(r, c) == DIG11)
                        {
                        bin_digit|= 1;
                        }
                }
        if(r != s_row + 2)
                {
                bin_digit= bin_digit << 1;
                if(spot(r, s_col) == DIG10 || spot(r, s_col) == DIG11)
                        {
                        bin_digit|= 1;
                        }
                bin_digit= bin_digit << 1;
                if(spot(r, s_col + 2) == DIG10 || spot(r, s_col + 2) == DIG11)
                        {
```

```
                    bin_digit|= 1;
                    }
            }
        spot(r, s_col)= spot(r, s_col + 1)= spot(r, s_col + 2)= BLANK;
        }
if(bin_digit == 0)
        return(10);

digit= 11;      /* There 'unknown' digit. */
best= 60;       /* The minimum score. */
for(numerics= 0; numerics < 20; numerics+= 2)
        {
        int     score0, /* Scoring based on number of 'empty's which agree. */
                score1, /* Scoring based on number of 'filled's which agree. */
                score;  /* Composite score with weighting. */

/* Compare filled segments. */
        if(bitcnt(digits[numerics + 1]) > 0)
                score1= bitcnt(bin_digit & digits[numerics + 1])
                        * 90 / bitcnt(digits[numerics + 1]);
        else
                score1= -1;

/* Compare empty segments. */
        if(bitcnt(digits[numerics + 1]) < 13)
                score0= bitcnt((~bin_digit & ~digits[numerics + 1]) & 0x1FFF)
                        * 120 / (13 - bitcnt(digits[numerics + 1]));
        else
                score0= -1;

if(score0 == -1)
                score0= score1;
        else if(score1 == -1)
                score1= score0;

score= (score0 + score1)/2;
        if(score > best && (score - best > 0 || digit == digits[numerics]))
                {
                digit= digits[numerics];
                best= score;
                }
        else if(abs(score - best) == 0) /* Tie */
                {
                digit= 11;
                if(score > best)
                        best= score;
                }
        }
return(digit);
}

/*****
        ******
        ***
        ***     Level 4.
        ***
        ******
        *****/
```

```
bitcnt(int word)
/*      int word:       A 16 bit integer.

This function counts the number of 1's in the 16-bit binary integer.
*/
{
int     x,
        c;

c= 0;
for(x= 0; x < 16; x++)
        {
        if (word & 1)
                c++;
        word= word >> 1;
        }
return(c);
}

/*****
        ******
        ***
        ***     Utility Functions.
        ***
        ******
        *****/ realness(int stat, int row, int col, int drow, int dcol, int max)
/*      int stat:       ON or OFF (what to look for)
        int row:        Row of center of scan area.
        int col:        Column of center of scan area.
        int drow:       Delta-row; how far up and down to scan.
        int dcol:       Delta-col; for far left and right to scan.
        int max:        How many matching pixels constitute a TRUE.

realness() scans a rectangular region pixel by pixel counting
        how many match the 'stat' status. If more than 'max' match
        at the end of the count TRUE is returned, otherwise FALSE.
*/
{
unsigned int
        r,
        c,
        cnt;

cnt= 0;
for(r= row - drow; r <= row + drow; r++)
        for(c= col - dcol; c <= col + dcol; c++)
                if(bit(r, c) == stat)
                        cnt++;
return(cnt >= max);
}
```

```
done(int e)
/*      int e:  DOS errorlevel.

- Exits to DOS with the specified errorlevel.
*/
{
exit(e);
} page_err(char *str)
/*      char *str:      Text describing the errorlevel.

- Records an error for output in the transaction file, echoes it to
          screen and sets the error flag to abort processing further on the
          page.
*/
{
if(!page_error)
        {
        page_error= TRUE;
        strcpy(page_error_str, str);
        printf("\nError: %s\n", str);
        }
} read_pcx_line(int line)
/*      int line:       index into the lines[] array.

- Reads in a line from the PCX file and decodes it into lines[line].
*/
{
static unsigned char
        buf[1024],
        *i;
static int
        c= -1;

if(line == -1)
        {
        c= -1;
        return;
        } if(c == -1)
        {
        i= buf + 1024;
        } c= 0;
while(c < 216)
        {
        if(i == buf + 1023 && (*i & 0xC0) == 0xC0)
                {
                i= buf + 1;
                *buf= buf[1023];
```

```
                _read(file_handle, i, 1023);
                i= buf;
                }
        if(i == buf + 1024)
                {
                i= buf;
                _read(file_handle, i, 1024);
                }
        if((*i & 0xC0) == 0xC0)
                {
                int     cc;

cc= c + *i - 0xC0;
                i++;
                for(;c < cc; c++)
                        {
                        bitmap[line][c]= *i;
                        }
                }
        else
                {
                bitmap[line][c]= *i;
                c++;
                }
        i++;
        }
} bit(int r, int c)
/*      int r: Row.
        int c: Column.

- Returns the value of the pixel at (r, c)
            If the pixel is below where the current window into the PCX is
            located more of the PCX is read until it can be 'seen.'
            If the pixel is above the window a page_err() is generated. There
            is no reason the algorithm needs to move back
            up the page; such an occurance usually means the page image being
            processed is not an I-Fax form.
*/
{
if(r < lo)
        {
        page_err("Accessed a point below the lowest row in the buffer.");
        return FALSE;
        }

/* Off the left or right edges? */
if(c < 0 || c > 1728)
        return FALSE;

while(r > hi)
        {
        lo+= PCXROWS/2;
```

```
        for(hi++;hi < lo + PCXROWS; hi++)
            read_pcx_line(hi%PCXROWS);
        hi--;
    } return !((bitmap[(r%PCXROWS)][c>>3] >> (7 - (c % 8))) & 1);
} get_hash_info(struct hash_s *h)
/*      struct hash_s *h:       Struct to store hash info in.

- Finds the size and coordinates of the center of the black area
          currently pointed to by (h->r, h->c) on the bitmap.
*/
{
int     t,
        b,
        l,
        r;

t= h->r - 1;
/* Find the top */
while(ness(ON, t, h->c, 0, 3, 75) && t > h->r - 44 && t > 0)
        t--;

b= h->r + 1;
/* Find the bottom */
while(ness(ON, b, h->c, 0, 3, 75) && b < h->r + 44 && b < pcx_header.y2)
        b++;

/* Average for the verticle center. */
h->rows= b - t - 1;
h->r= (t + b)/2;

l= h->c - 1;
/* Find the left. */
while(ness(ON, h->r, l, 3, 0, 75) && l > h->c - 102 && l > 0)
        l--;

r= h->c + 1;
/* Find the right. */
while(ness(ON, h->r, r, 3, 0, 75) && r < h->c + 102 && r < pcx_header.x2)
        r++;
/* Average for the horizontal center. */
h->cols= r - l - 1;
h->c= (l + r)/2;
} find_next_hash(struct hash_s *h)
/*      struct hash_s *h:       (h->r, h->c) is the location of the center
                                of the current hash.
```

```
            - Scans straight down from the center of a known hash mark to
              find the one directly below it. Calls get_hash_info() to
              find the center and dimensions.
*/
{
int     r;

r= h->r + h->rows; /* Get past this hash */

/* Scan down till we hit a big black spot. */
while (r < pcx_header.y2 && !ness(ON, r, h->c, 2, 2, 48))
        r+= 4;

if(r >= pcx_header.y2)
        {
        page_err("Missing timing marker, ran off page bottom.");
        return;
        } h->r= r + 5;    /* Move a bit further into it, then call get_hash_info() */
get_hash_info(h);
} find_next_row(int init)
/*      int init:       Initialize? (TRUE or FALSE)

- A frontend to find_next_hash() which keeps track of the centers
          of the whitespace between the current hash and both the one before
          and the one after for use in check2digit().
          Finds the next left and write hashes and updates the half_left
          and half_right structures to point to the correct piece of
          whitespace depending on whether the form is upside down or not.
*/
{
static struct hash_s
        l_prev,
        r_prev,
        l_next,
        r_next;

if(init)
        {
        l_next.r= left.r;
        l_next.c= left.c;
        l_next.rows= left.rows;
        l_next.cols= left.cols;
        r_next.r= right.r;
        r_next.c= right.c;
        r_next.rows= right.rows;
        r_next.cols= right.cols;

find_next_hash(&l_next);
        find_next_hash(&r_next);
        }
```

```
l_prev.r= left.r;
l_prev.rows= left.rows;
l_prev.c= left.c;
l_prev.cols= left.cols;

r_prev.r= right.r;
r_prev.rows= right.rows;
r_prev.c= right.c;
r_prev.cols= right.cols;

left.r= l_next.r;
left.rows= l_next.rows;
left.c= l_next.c;
left.cols= l_next.cols;

right.r= r_next.r;
right.rows= r_next.rows;
right.c= r_next.c;
right.cols= r_next.cols;

find_next_hash(&l_next);
find_next_hash(&r_next);

if(!upside_down)
        {
        half_left.r= (left.r + l_next.r)/2;
        half_left.c= (left.c + l_next.c)/2;
        half_right.r= (right.r + r_next.r)/2;
        half_right.c= (right.c + r_next.c)/2;
        }
else
        {
        half_left.r= (left.r + l_prev.r)/2;
        half_left.c= (left.c + l_prev.c)/2;
        half_right.r= (right.r + r_prev.r)/2;
        half_right.c= (right.c + r_prev.c)/2;
        }
}
```

APPENDIX C

Program FaxDes

I-Fax technology centres around the notion that it can process information that is hand written on a "piece of paper" and transmitted to a computer via a Group III fax machine. This "piece of paper", however, must be in a special form. An I-Fax form is an application-specific fax form which defines the types and formats of information that the systems' users will be dealing with.

FaxDes is a full-screen user interface for the creation of I-Fax forms. FaxDes is an interactive package with built-in comprehensive help feature.

All I-Fax documents have two columns of timing markers, one running down each site of the page. These markers allow the I-Fax software to orient itself with respect to the page during the process of image recognition. The layout of the timing markers, their spacing from the sides of the page (3/4"), and the blank spaces created at the top and at the bottom (also 3/4") of each I-Fax form are done automatically by the software. FaxDes allows the user to create only "the inside" of I-Fax forms.

The area of the form available to the user during the design process is 40 columns by up to 120 lines. FaxDes prompts for the length of the form, in lines, at the time of its creation. There are four general types of user entered information which can appear on the form: small and large text, which can be either centered, or left or right justified, input spots, output spots, and numerics.

Input spots are small squares which the user can fill in with his pen to indicate Yes/No, or choose from a list of options, for instance.

A numeric digit appears on the page as an outline of a figure eight similar to those displayed by digital calculators. The user is expected to write into the figure eight a single digit between 0 and 9. Groups of numerics, side by side, can be used to obtain a stock number, price quote, or phone number from a user, for an example.

The utilization, layout, and artistic design of different types of information is application dependent and open to user's creativity.

Included are five flowcharts and a source code of a program FaxDes.

| FLOWCHART | System<br>I-Fax | Chart No.<br>1 | Page No.<br>1 |
|---|---|---|---|
| | Procedure<br>FaxDes | Author<br>E.Chwialkowska | Effective Date<br>Jan 25, 1991 |
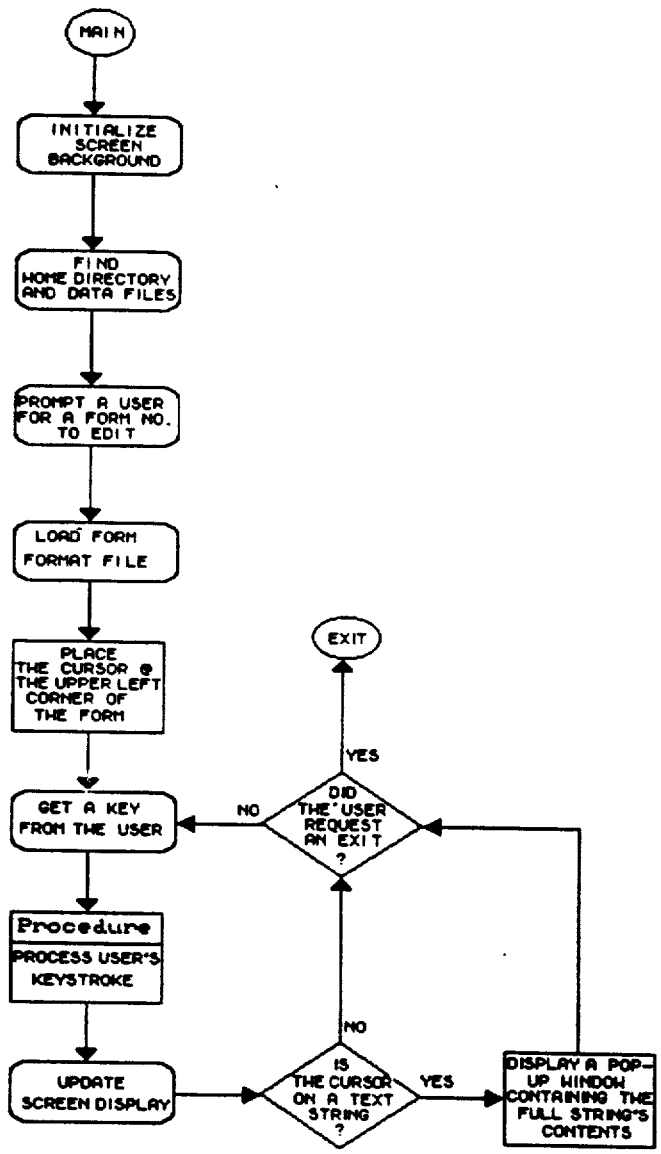

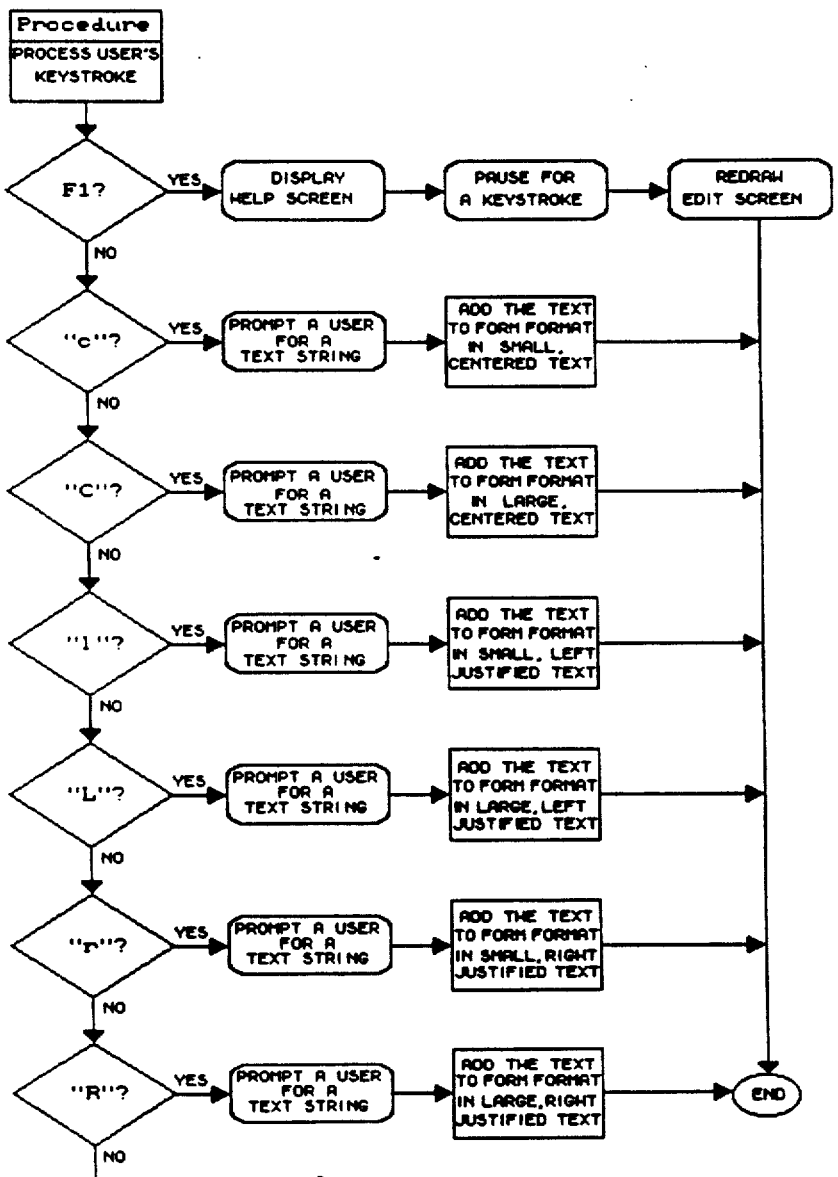

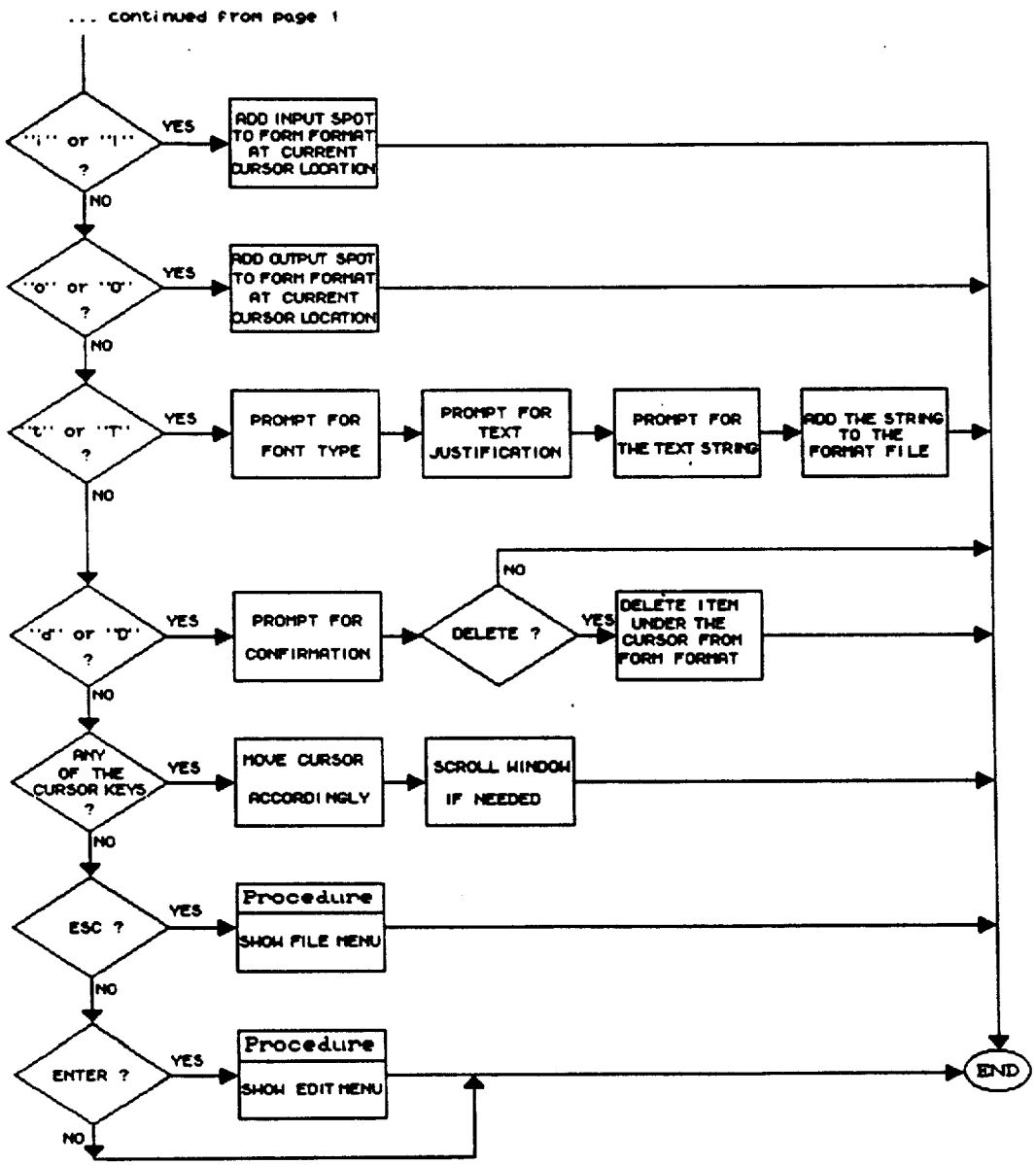

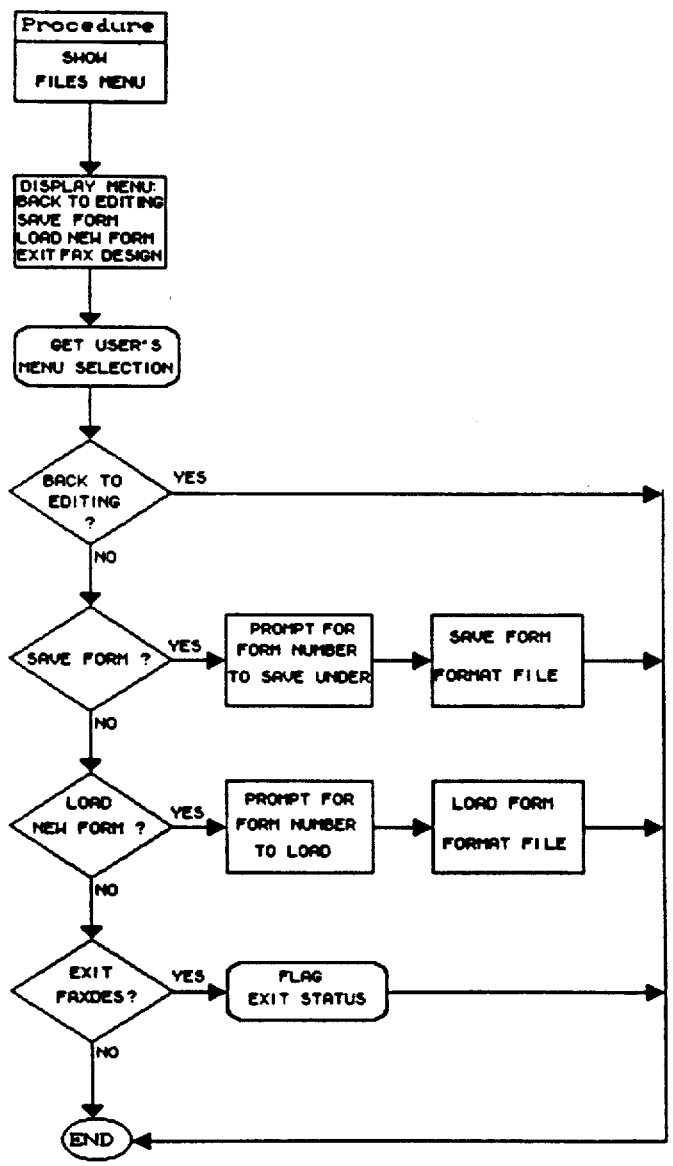

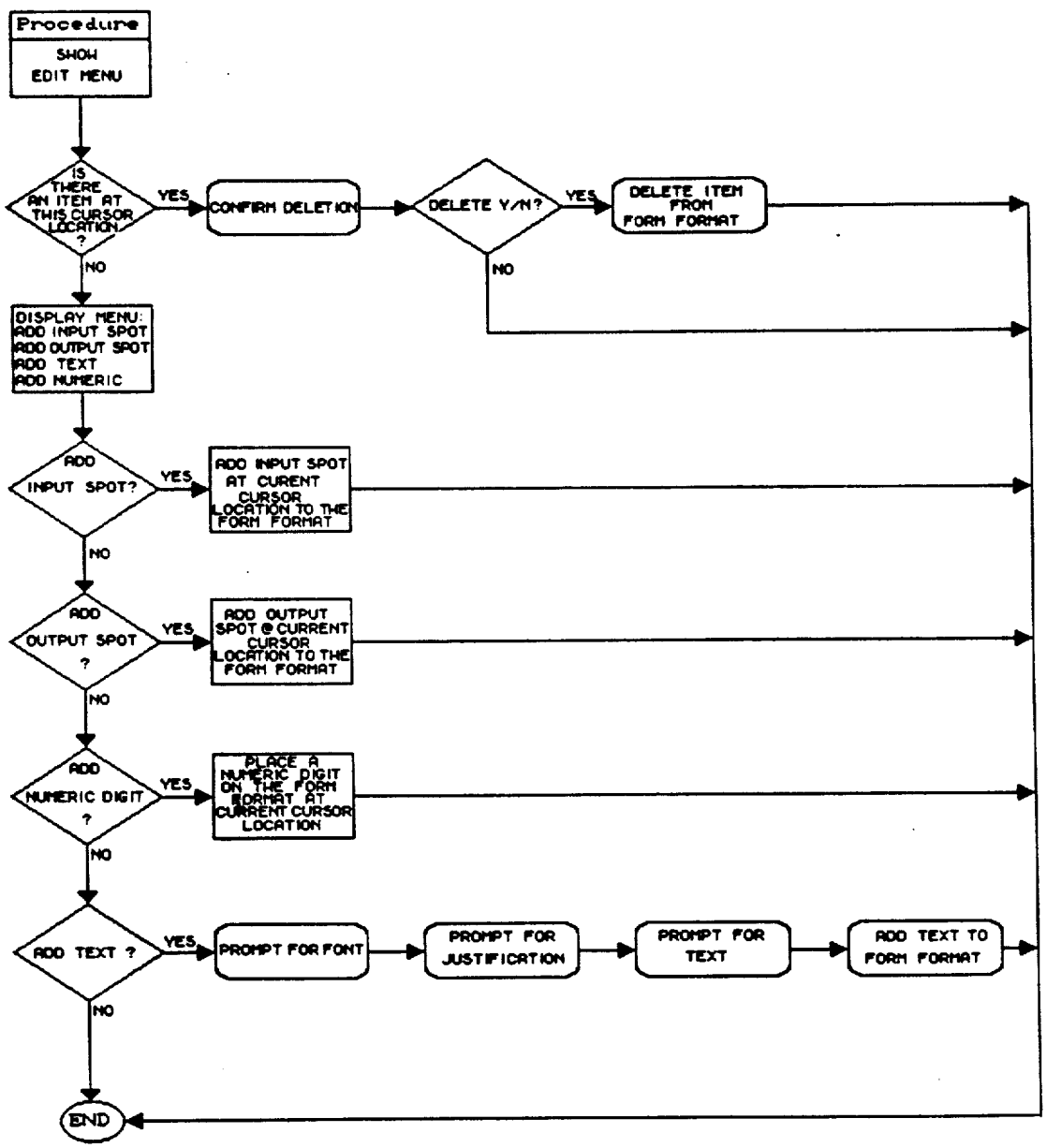

@macro ∅ ""

```
/*****
******
***
***    File:    faxdes.c
***    Purpose: Provide a full-screen user interface for the creation of I-Fax
***             forms.
***
******
*****/ if !defined(__SMALL__)
/* MUST BE COMPILED UNDER SMALL MODEL AND USING FAXDES.PRJ */
else int MAX_ROWS= 53;

include <stdio.h>
#include <string.h>
#include "w1.h"
#include "windprot.h"
#include "color.h"
#include "fax.h"
#include "faxdir.h"

#define CM (wiattr(WHITE, BLACK))       /* Main, normal text */
#define CI (wiattr(LIGHTGRAY, BLACK))   /* Instructions text, low intensity */
define CH (wiattr(BLACK, LIGHTGRAY))   /* Hilighted: Reverse video */ define max(a, b) (a > b ? a : b)
define min(a, b) (a < b ? a : b)

#define BS       (8)                    /* Keyboard constants */
#define ENTER    (13)
#define ESC      (27)
#define F1       (2000 + ';')
#define UP       (2000 + 'H')
#define DOWN     (2000 + 'P')
#define LEFT     (2000 + 'K')
#define RIGHT    (2000 + 'M')
#define PGUP     (2000 + 'I')
#define PGDN     (2000 + 'Q')
#define HOME     (2000 + 'G')
#define END      (2000 + 'O')
#define DEL      (2000 + 83)
#define INS      (2000 + 82)
```

```c
#define CTRL_LEFT (2000 + 115)
#define CTRL_RIGHT (2000 + 116)
#define TAB       (9)
#define LTAB      (2000 + 15)

#define FALSE    (0)
define TRUE     (1)

define PROMPT   (0)      /* Used in add_text() to signal prompting for text. */ define CENTER   (1)      /* Text justification. */
define LEFTJ    (2)      /* Note: Means lined up on the right and
                                   extends out to the left, NOT left justified.*/
#define RIGHTJ   (3)      /* Note: Means lined up on the left and extends out
                                   to the right, NOT right justified. */ define HIDECURSOR    (8192)  /* Constant to set cursor invisible. */ typedef char   menu[35];      /* Menu entries. */ int     oldcursor;            /* Hold original cursor shape. */ int     form,                 /* Form number */
        oRow,                 /* Origin Row; used in scrolling the window
                                 around the form. */
        Row,
        Col;
char    *spots= (char *)NULL; /* Grid of items on the form. */ struct s_string
        strings[127];         /* Holds text strings to be
                                 placed on the form */ int     depth= 0;             /* How far down the form is the cursor. */ menu    help_screen[16]= {
" Key| Function",
"----+-----------------------",
" F1 | This help",
"Esc | Files Menu",
"I/i | Input Spot",
"O/o | Output Spot",
"N/n | Numeric Digit",
"T/t | Text",
"D/d | Delete",
" c  | Centered SMALL Text",
" l  | Left-aligned SMALL Text",
" r  | Right-aligned SMALL Text",
" C  | Centered LARGE Text",
" L  | Left-aligned LARGE Text",
" R  | Right-aligned LARGE Text",
"    |"};

char    exe_dir[128];

char    insert_mode= TRUE;    /* Insert mode on for editing text. */
```

```
/*****
 ******
 ***
 ***    Level 1.
 ***
 ******
 *****/ main(int argc, char **argv)
{
int     key= 0,
        stringwindow= 0;        /* String under the cursor which is being
                                   shown on the screen. */
static menu exit_menu[5]=
        {
        "Back to Editting",
        "Save Form",
        "Load New Form",
        "Exit FaxDesign",
        ""
        };

initwindow(CM);                 /* Initialize the windowing software. */ oldcursor= cursorchange(14);    /* Turn the cursor into a block. */

/* Draw the background for the editting screen. */
qwritev(1, 12, CM, "┌─────────┐");
qwritev(2, 12, CM, "|FaxDesign|");
qwritev(3, 12, CM, "└─────────┘");
qfill(2, 11, 2, 1, CI, 219);
qwritev(4, 11, CI, "███████████");

qwritev(6, 6, CM, "(c) Copyright 1990 by");
qwritev(7, 7, CM, "Worthington Software");
qwritev(8, 13, CM, "Company,");
qwritev(9, 7, CM, "All Rights Reserved.");

qfill(11, 2, 1, 38, CM, '·');
qfill(12, 2, 1, 38, CM, '·');
qwritev(12, 3, CM, "Form:        · Row  1 Col  1");
qfill(13, 2, 1, 38, CM, '·');
qfill(3, 35, 23, 1, CI, '█');
qfill(2, 35, 1, 1, CM, 219);
qwritev(1, 35, CI, "▄");
qwritev(25, 35, CI, "▀");

makewindow(1, 38, 25, 42, CM, CM, nobrdr);
qbox(1, 38, 25, 42, CM, CM, singlebrdr);
```

```
qwritev(15, 5, CI, "Use arrow keys (↑↓ ) to");
qfill(15, 23, 1, 1, CI, 26);
qwritev(16, 3, CI, "move the cursor around the");
qwritev(17, 3, CI, "page. PgUp and PgDn scroll");
qwritev(18, 3, CI, "the page by one screen");
qwritev(19, 3, CI, "height. Press the Enter (↵)");
qwritev(20, 3, CI, "key to add, delete, or edit:");
qwritev(21, 4, CI, "o input/output spots");
qwritev(22, 4, CI, "o text");
qwritev(23, 4, CI, "o numeric digits");
qwritev(24, 8, CH, "Press F1 for help");
qwritev(25, 5, CH, "Press Esc for files menu");

find_exe_dir(exe_dir, argv[0]);      /* Find the home directory and support
                                        files. */ load_form();       /* Load a form, or create a blank form. */
if(form == 0)
        done(0);

oRow= 0;
Row= Col= 1;       /* Go to the upper left corner of the form. */
display_screen();  /* Draw the form onto the screen. */ while(key != ESC)  /* WHILE loop untill ESC is hit... */
        {
        char    rowcol[4],    /* sprintf() buffer to hold the row and col
                                  number for display */
                r,
                c,
                ri,
                ci;

/* If there is a stringwindow open on the screen, and the cursor
                    is no longer on the string to which it corresponds, erase it. */
                if(spot(Row, Col) <= BLANK && stringwindow != 0)
                        {
                        removewindow();
                        stringwindow= 0;
                        gotorc(Row - oRow + 1, Col + 38);
                        }

/* If the cursor is on a string and there isn't a stringwindow
                        already open containing it, open one. */
                if(spot(Row, Col) > BLANK && stringwindow != spot(Row, Col))
                        {
                        int     i,
                                drow;

/* If by some chance a stringwindow has been
                                left open, close it */
                        if(stringwindow > 0)
                                removewindow();

stringwindow= spot(Row, Col);
```

```
i= spot(Row, Col) - 1;

/* Select a row so that the stringwindow doesn't cover
   up the area around the cursor. */
drow= strings[i].row - oRow + 1;

if (drow == 7 || drow == 8 || drow == 9)
        drow= 10;
if (drow == 15 || drow == 16 || drow == 17)
        drow= 14;
makewindow((drow > 12 ? drow - 5 : drow + 3),
(78 - strlen(strings[i].text))/2, 3, strlen(strings[i].text) + 2,
CH, CH, doublebrdr);
qwritev((drow > 12 ? drow - 4 : drow + 4), (78 - strlen(strings[i].text))/2 + 1,
        CH, strings[i].text);
gotorc(Row - oRow + 1, Col + 38);
} key= exgetch(); /* Ket an extended character from the keyboard. */
    switch(key)
            {
            /* Perform an action based on the character entered. */
            case F1:        /* Help */
                    if(stringwindow > 0)
                            {
                            removewindow();
                            stringwindow= 0;
                            }
    /             do_help();
                    break;
            case 'c':
                    add_text(SMALLFONT, CENTER, "");
                    break;
            case 'C':
                    add_text(LARGEFONT, CENTER, "");
                    break;
            case 'l':
                    add_text(SMALLFONT, LEFTJ, "");
                    break;
            case 'L':
                    add_text(LARGEFONT, LEFTJ, "");
                    break;
            case 'r':
                    add_text(SMALLFONT, RIGHTJ, "");
                    break;
            case 'R':
                    add_text(LARGEFONT, RIGHTJ, "");
                    break;
            case 'i':       /* Input spot */
case 'I':
  add_input();
  break;
            case 'o':       /* Output spot */
case 'O':
  add_output();
  break;
case 'n':
```

```
case 'N':
    add_numeric();
    break;
case 't':
case 'T':
                add_text(PROMPT, PROMPT, "");
                break;
        case 'd':       /* Delete whatever is under the cursor. */
        case 'D':
                r= Row;
                switch(spot(Row, Col))
                    {
                    case INPUT:
                        spot(Row, Col)= BLANK;
                        qfill(Row - oRow + 1, Col + 38, 1, 1, CH, 32);
                        break;
                    case OUTPUT:
                        spot(Row, Col)= BLANK;
                        qfill(Row - oRow + 1, Col + 38, 1, 1, CH, 32);
                        break;
                    case DIGIT_3:
                            r--;    /* Get to the first row of */
                    case DIGIT_2:   /* the numeric. */
                        r--;
                case DIGIT_1:
                case DIGIT_UL:
                    c= Col;
                    /* Get to the left corner. */
                    while(spot(r, c) != DIGIT_UL)
                            c--;
                    /* Erase the numeric. */
                    for(ri= r; ri < r + 3; ri++)
                            for(ci= c; ci < c + 3; ci++)
                                    spot(ri, ci)= BLANK;
                    display_screen();
                    break;
                case BLANK:
                    beep();
                    break;
                default:
                    /* There is text under the cursor. */
                    ri= spot(Row, Col) - 1;
                    if (ri >= 0 && ri < 127)
                        {
                        for(c= strings[ri].col; c < strings[ri].col + strings[ri].dlen; c++)
                                for(r= strings[ri].row; r > strings[ri].row -
                                    (strings[ri].font == LARGEFONT ? 2 : 1); r--)
                                        spot(r, c)= BLANK;
                        print_row(Row, Row - oRow + 1);
                        print_row(Row - 1, Row - oRow);
                        print_row(Row + 1, Row - oRow + 2);
                        strings[ri].row= strings[ri].col= strings[ri].dlen= strings[ri].font=
strings[ri].locale= strings[r].     text[0]= 0;
                        }
                    break;
                }
        break;
```

```
case ENTER:
      if(stringwindow > 0)    /* Erase the string window */
      {
      removewindow();
      stringwindow= 0;
      }
      edit_spots();   /* Prompt the user for
                         possible options */
      break;
case TAB:
      Col+= (10 - (Col % 10));
      if(Col > 40)
            Col= 40;
      break;
case LTAB:    /* Left TAB */
      if (Col % 10 == 0)
            Col--;
      Col-= Col % 10;
      if(Col < 1)
            Col= 1;
      break;
case HOME:
      Col= 1;
      break;
case END:
      Col= 40;
      break;
case LEFT:
      if(Col > 1)
            Col--;
      else
            beep();
      break;
case RIGHT:
      if (Col < 40)
            Col++;
      else
            beep();
      break;
case PGUP:
      if (stringwindow > 0)
            {
            removewindow();
            stringwindow= 0;
            }
      oRow= max(oRow - 24, 0);
      Row= max(Row - 24, 1);
      display_screen();
      break;
case PGDN:
      if (stringwindow > 0)
            {
            removewindow();
            stringwindow= 0;
            }
```

```
                oRow= min(oRow + 24, MAX_ROWS - 23);
                Row= min(Row + 24, MAX_ROWS);
                display_screen();
                break;
        case UP:
                if(Row > 1)
                        {
                        if (stringwindow > 0)
                                {
                                removewindow();
                                stringwindow= 0;
                                }
                        Row--;
                        if (Row - oRow + 1 == 1 && oRow > 0)
                                {
                                oRow--;
                                scrollwindow(1, 25, down);
                                if (oRow > 0)
                                        print_row(oRow, 1);
                                else    /* Draw a line across the
                                           top of the form if
                                           it is visible. */
                                        {
                                        qfill(1, 39, 1, 40, CM, 196);
                                        qfill(1, 38, 1, 1, CM, 218);
                                        qfill(1, 79, 1, 1, CM, 191);
                                        }
                                }
                        }
                else
                        beep();
                break;
        case DOWN:
                if(Row < MAX_ROWS)
                        {
                        if (stringwindow > 0)
                                {
                                removewindow();
                                stringwindow= 0;
                                }
                        Row++;
                        if (Row - oRow + 1 == 25 && oRow < MAX_ROWS - 23)
                                {
                                oRow++;
                                scrollwindow(1, 25, up);
                                if (oRow < MAX_ROWS - 23)
                                        print_row(oRow + 24, 25);
                                else
                                        /* Draw a line across the
                                           bottom of the form if the
                                           bottom of the form is
                                           visible. */
                                        {
                                        qfill(25, 39, 1, 40, CM, 196);
                                        qfill(25, 38, 1, 1, CM, 192);
                                        qfill(25, 79, 1, 1, CM, 217);
                                        }
                                }
```

```
                }
            }
        else
                beep();
            break;
    case ESC:    /* User wants to save/load/exit */
                 /* Show a menu, set key= 0 unless user
                    chooses EXIT, then leave key == ESC */
            switch(makemenu(10, 24, " Files Menu ", exit_menu))
            {
            case 1:
            case 0: /* Return to editting */
                    key= 0;
                    break;
            case 2:
                    save_form();
                    key= 0;
                    break;
            case 3:
                    if(stringwindow > 0)
                            {
                            removewindow();
                            stringwindow= 0;
                            }
                    load_form();
                    oRow= 0;
                    Row= Col= 1;
                    display_screen();
                    key= 0;
                    break;
            case 4:
  if(!getyn(" Exit FaxDesign ", "Do you really wish to exit?"))
    key= 0;
                            break;
                    }
            break;
        deafult:
                beep();
                break;
        }

/* Make sure the cursor is at the correct location, update the
   ROW/COL display and move the bar at the side of the display r= getch();
        r+= 2000;
        } return(r);
} print_row(int r, int drow)
/*      int r:  Form row to display.
        int drow:       Screen line to display it on.
        /
```

```
        - Looks in the spots[] grid which represents the layout of the form
          and draws one row (r) of the form onto the screen on line drow.
*/
{
int     c;

if (r < 1 || r > MAX_ROWS)
        return;

qfill(drow, 38, 1, 1, CM, 179);  /* Draw the borders onto the sides. */
qfill(drow, 79, 1, 1, CM, 179);

/* For each column of the form */
for(c= 1; c <= 48; c++)
        {
        char    s;

/* Display the correct symbol(s) on-screen. */
        s= spot(r,c);
        switch(s)
                {
                case BLANK:     /* space */
                        qfill(drow, 38 + c, 1, 1, CM, 32);
                        break;
                case INPUT:     /* box */
                        qfill(drow, 38 + c, 1, 1, CM, 254);
                        break;
                case OUTPUT:    /* slashed-o */
                        qfill(drow, 38 + c, 1, 1, CM, 237);
                        break;
                case DIGIT_U1:  /* top row of digit */
                        qwritev(drow, 38 + c, CM, "▀▀");
                        c+=2;
                        break;
                case DIGIT_2:   /* middle row of digit */
                        qwritev(drow, 38 + c, CM, "├┤");
                        c+= 2;
                        break;
                case DIGIT_3:   /* bottom row of digit */
                        qwritev(drow, 38 + c, CM, "▄▄");
                        c+= 2;
                        break;
                default:
                        /* Display a string on the line. */

/* If the string's baseline is on this line and starts
                           at this column. */
                        if(s > BLANK && strings[s-1].row == r && strings[s-1].col == c)
                                {
                                char    pstr[81];

strcpy(pstr, strings[s-1].text);
                        pstr[strings[s-1].dlen]= 0;
                        while(strlen(pstr) < strings[s-1].dlen)
                                strcat(pstr, " ");
                        if (strings[s-1].dlen < strlen(strings[s-1].text))
                                pstr[strings[s-1].dlen - 1]= 175;
```

```
               qwritev(drow, 38 + c, CH, pstr);
               c+= strings[s-1].dlen - 1;
               }

/* else, if the string just extends up onto this line
              (ie, in LARGE font) */
           else if (s > BLANK && r < strings[s-1].row)
               {
               qfill(drow, 38 + c, 1, strings[s-1].dlen, CH, ' ');
               c+= strings[s-1].dlen - 1;
               }
       break;
       }
   }
} endif
```

APPENDIX D

Program FaxSend

FaxProc analyses an incoming form, processes a request and then generates a response which is going to be faxed back to the inquiring user (or re-routed somewhere else if so requested). Depending on application and/or specific request the response can take a form of a text, data, or a graph. The software which handles the transmission of a response is called FaxSend.

FaxSend is a general purpose utility for queuing files into the send queue of the Intel Fax Card. The types of information which can be queued are: regular text (80 columns), compressed text (132 columns), and graphics files (PCX and DCX files).

FaxSend allows user to specify a list of files which he wishes to send to another fax machine. FaxSend can operate in one of two modes: command line driven mode queuing files for an immediate transmission by the Intel Connection Coprocessor, and the server mode when one of the I-Fax machines running on the network stays operational and monitors a specified directory of the files to be sent out.

FaxSend logs the results of all transmissions to the special file FAXSEND.LOG.

Included are three flowcharts and a source code of a program FaxSend.

| FLOWCHART | System I-Fax | Chart No. 1 | Page No. 1 |
|---|---|---|---|
| | Procedure FaxSend | Author E.Chwialkowska | Effective Date Jan.25,1991 |
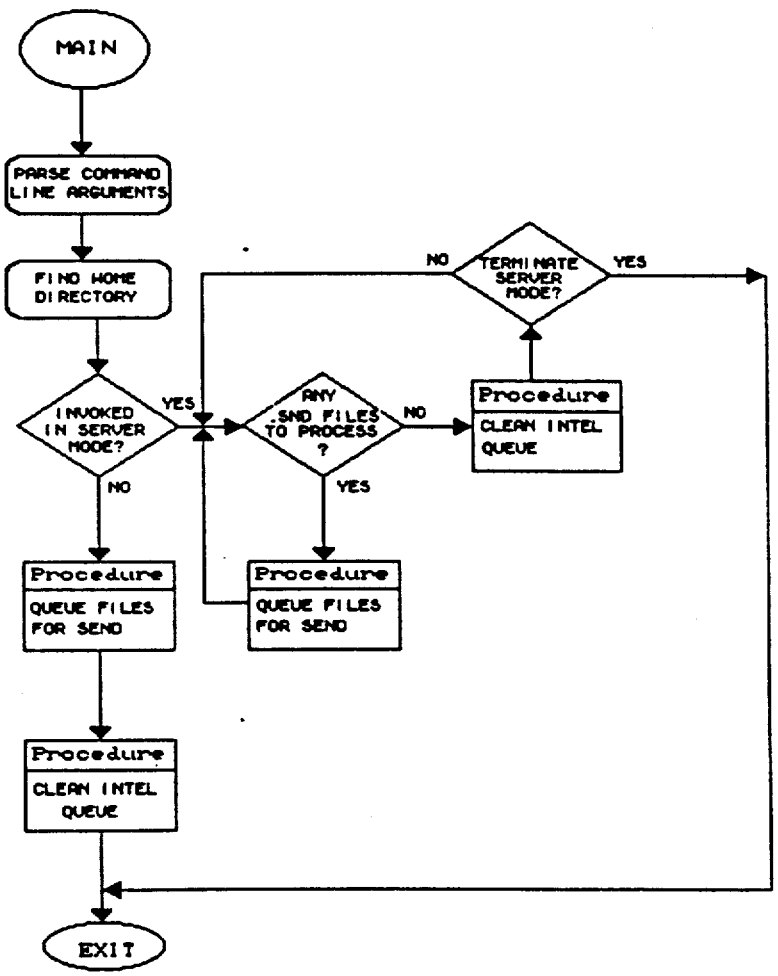

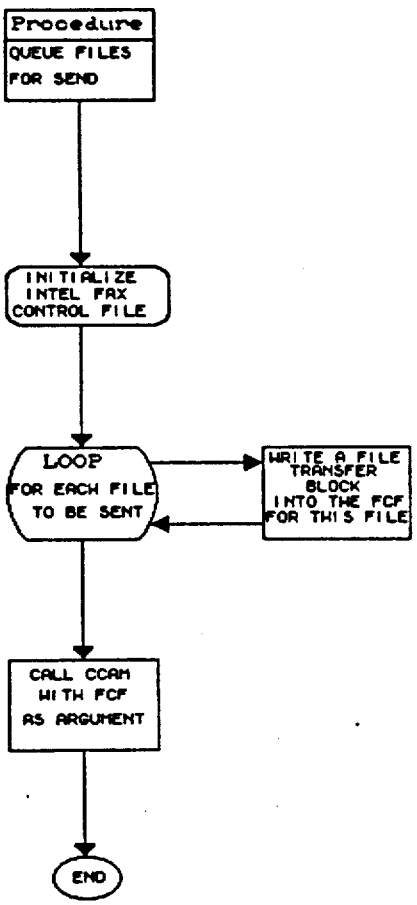

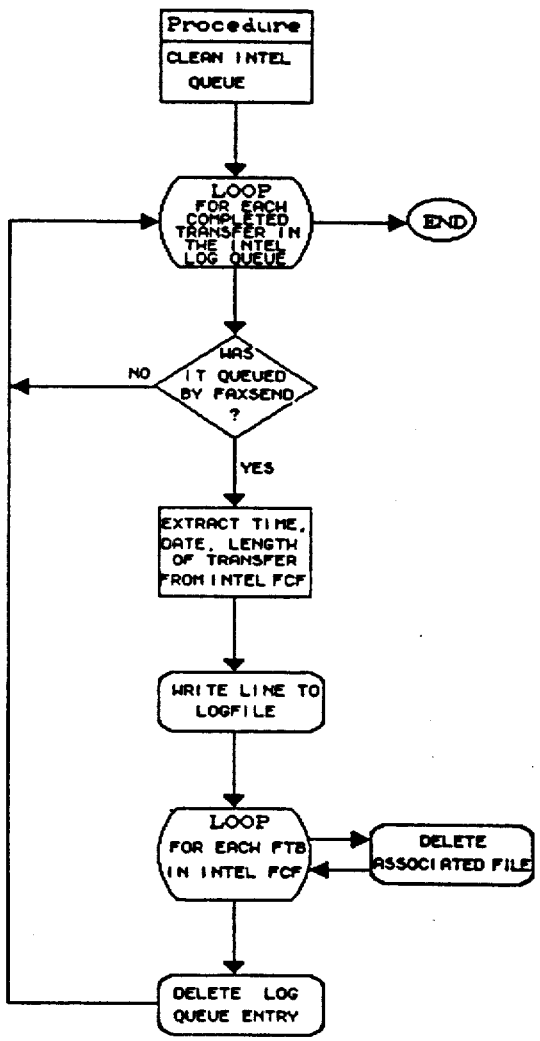

```c
/*****
******
***
***     File:    faxsend.c
***     Purpose: FaxSend is a general purpose utility for queuing files
***              into the send queue of the Intel Fax Card. It can queue
***              text (80 columns), compressed text (132 columns), PCX
***              and DCX files.
***
******
*****/
        / include <dos.h>
include <stdio.h>
include <io.h>
#include <string.h>
#include <alloc.h>
#include "faxdir.h"

#define SAME      (0)       /* for strcmp() */
#define TRUE      (1)
#define FALSE     (0)

#define SUCCESSFUL  (0)     /* Return code from CCAM on transmission. */
#define FAILURE     (5)

union REGS
  regs;

struct fs_s     /* The name of the fax control file which must be passed
                   to the Intel Connection Coprocessor. */
        {
        faxcf_filename[80];
        } fs;

struct faxcb_s /* The Fax Conntrol Block which instructs the Intel Fax Card
                  about the nature of the event. (see the Intel/DCA CAS guide
                  for details) */
    {
    char   type,
                tran_type;
        int    status,
    time,
                date,
                num_files,
                file_off;
        char   phone[47],
    appl_tag[64],
                reserved[14],
    coverpage,
                reserved1[101],
                to[32],
                from[32],
                reserved2[80];
    } faxcb;
```

```c
struct ftr_s   /* The File Transfer Record; one is appended to the fax control
                  file for each file to be sent. (see the Intel/DCA CAS
                  for more information) */
    {
    char    file_type,
            text_size,
            reserved[11];
    int     pages;
    char    file[86],
            inches8th,
            inches,
            reserved1[31];
    } ftr;

char    logfile[128];   /* Filename of the logfile. */
int     nodelete;       /* Controls whether files are marked for deletion
                           upon completion of transmission. */
/

/*****
******
***
***     Level 1.
***
******
*****/ main(int argc, char **argv)
{
FILE   *faxcf= (FILE *)NULL;
struct time
        t;
struct date
        d;
int x;

printf("FaxSend           (c) Copyright 1998 by Worthington\n");
printf("            Software Company, All Rights Reserved.\n\n");

argc--;

if (argc == 0 || argc == 2)
        {
        printf("Usage:\n");
        printf("     FAXSEND [NODELETE] \"to\" \"from\" \"phone number\" [d:][path]filename[.TXT|.1321.PCX|.DCX] ...\n");
        printf("        or\n");
        printf("     FAXSEND SERVER mode [d:]path\n");
        printf("        or\n");
        printf("     FAXSEND LOG\n\n");
        printf("* 'NODELETE' if included stops FaxSend from deleting the files after they\n");
        printf("            are sent. Note: must be in all uppercase.\n");
```

```c
printf("* 'LOG' updates the FAXSEND.LOG file with information about completed events.\n");
printf("* 'mode' controls the SERVER operation of FaxSend, and can be:\n");
printf("    F: continue operation FOREVER (until Esc is pressed)\n");
printf("    O: wait until ONE transmission has been sent, then exit\n");
printf("    PO: send ONE of any PENDING transmissions then exit;\n");
printf("        if there are no pending sends, then exit with an errorlevel of 3\n");
printf("    PA: send ALL PENDING transmissions then exit;\n");
printf("        if there are no pending sends, then exit with an errorlevel of 3\n");
printf("    #: by placing a number on the command line you specify the number of\n");
printf("        seconds to remain operative before exitting (can be 1 - 2.1 x 10^9)\n");
printf("* '[d:]path' specifies where the server should look for control files\n\n");
exit(1);
}
regs.h.ah= 0xC0;
regs.h.al= 0x00;
int86(0x2F, ®s, ®s);     /* Check if the CCAM is installed. */
if(regs.h.al != 0xFF)
    {
    printf("Intel Connection Coprocessor Resident Manager not installed; operation aborted.\n");
    exit(1);
    } find_exe_dir(logfile, argv[0]); /* Locate home directory and place the log file
                                    there. */
strcat(logfile, "FAXSEND.LOG");

if(strncmp(argv[1], "NODELETE", 8) == SAME)    /* If NODELETE is on the
                                                  command line, flag it as such
                                                  and then shift parameters
                                                  to the left. */
    {
    int    c;
    for(c= 1; c < argc; c++)
            argv[c]= argv[c+1];
    argc--;
    nodelete= TRUE;
    }
else
    nodelete= FALSE;

if(argc == 1)          /* Process the command line. */
    {
    strupr(argv[1]);
    if(strcmp(argv[1], "LOG") != SAME)
            {
            printf("Unrecognised command. (%s)\n", argv[1]);
            exit(1);
            }
    clean_files(SUCCESSFUL);  /* Remove entries from the CCAM log queue, */
    clean_files(FAILURE);     /* and delete files from disk for completed
                                    transmissions. */
    exit(0);
    } if (argc == 3)   /* Should have been invoked in SERVER mode. */
    {
```

```
        strupr(argv[1]);
        if(strcmp(argv[1], "SERVER") != SAME)
                {
                printf("Unrecognised command. (%s)\n", argv[1]);
                exit(1);
                }
        server(argv[2], argv[3]);       /* Call the server module. */
        }

/* Perform checks on command line arguments. */
if(strlen(argv[1]) >= 32)
        {
        printf("'to' field must be less than 32 characters long. (%s)\n", argv[1]);
        exit(1);
        } if(strlen(argv[2]) >= 32)
        {
        printf("'from' field must be less than 32 characters long. (%s)\n", argv[2]);
        exit(1);
        } if(strlen(argv[3]) >= 47)
        {
        printf("'phone number' field must be less than 47 characters long. (%s)\n", argv[3]);
        exit(1);
        }

/* Initialize the Fax Control Block structure. */
faxcb.type= 0;
faxcb.tran_type= 0;
faxcb.status= 1;
faxcb.time= faxcb.date= 0;
faxcb.num_files= argc - 3;
faxcb.file_off= 383;
strcpy(faxcb.phone, argv[3]);

gettime(&t);
getdate(&d);

sprintf(faxcb.appl_tag, "FaxSend 1990 [%i%02i%02i%02i:%02i:%02i.%02i]%c", d.da_year,
d.da_mon, d.da_day, t.ti_hour, t.ti_min, t.ti_sec, t.ti_hund,
(nodelete ? 'N' : 'D'));
for(x= 0; x < 14; x++)
        faxcb.reserved[x]= 0;
faxcb.coverpage= 0;
for (x= 0; x < 101; x++)
   faxcb.reserved1[x]= 0;

strcpy(faxcb.to, argv[1]);
strcpy(faxcb.from, argv[2]);

for (x= 0; x < 80; x++)
   faxcb.reserved2[x]= 0;

for(x= 0; x < 11; x++)
        ftr.reserved[x]= 0;
```

```c
ftr.pages= 0;
ftr.inches8th= 0;
ftr.inches= -1;
for(x= 0; x < 31; x++)
        ftr.reserved1[x]= 0;

do      /* Open a unique file for the Fax Control File */
        {
        if(faxcf != (FILE *)NULL)
                fclose(faxcf);
        gettime(&t);
        sprintf(fs.faxcf_filename, "%02i%02i%02i%02i.FCF", t.ti_hour, t.ti_min, t.ti_sec,
                t.ti_hund);
        }
        while((faxcf= fopen(fs.faxcf_filename, "rb")) != (FILE *)(NULL));

if ((faxcf= fopen(fs.faxcf_filename, "wb")) == (FILE *)(NULL))
        {
        printf("Unable to open Fax Control File file for write. (%s)\n",
                fs.faxcf_filename);
        exit(1);
        }
/* Write the Fax Control Block to the Fax Control File (FCF) */
fwrite(&faxcb, sizeof(struct faxcb_s), 1, faxcf);

/* Append a File Transfer Record for each file to be sent. */
for(x= 4; x <= argc; x++)
        {
        FILE    *test;
        char    file[128];

strcpy(file, argv[x]);
        fullpath(file);         /* Obtain an absolute path to the file. */
        if((test= fopen(file, "rb")) == (FILE *)NULL)
                {
                printf("File not found, transfer aborted. (%s)\n", file);
                fclose(faxcf);
                unlink(fs.faxcf_filename);
                exit(1);
                }
        fclose(test);

if(strcmp(file + strlen(file) - 4, ".TXT") != SAME &&
           strcmp(file + strlen(file) - 4, ".PCX") != SAME &&
           strcmp(file + strlen(file) - 4, ".DCX") != SAME &&
           strcmp(file + strlen(file) - 4, ".132") != SAME)
                {
                printf("Unkown file type, must be .PCX, .DCX, .TXT, or .132; tansfer aborted. (%s)\n",
                        file);
                fclose(faxcf);
                unlink(fs.faxcf_filename);
                exit(1);
                }

/* Fill in the FTR */
        switch(*(file + strlen(file) - 3))
```

```c
                {
                case 'T':
                        ftr.file_type= 0;
                        ftr.text_size= 0;
                        break;
                case '1':
                        ftr.file_type= 0;
                        ftr.text_size= 1;
                        break;
                case 'P':
                        ftr.file_type= 1;
                        break;
                case 'D':
                        ftr.file_type= 2;
                        break;
                }
        strcpy(ftr.file, file);
        printf("Sending: %s\n", file);
        fwrite(&ftr, sizeof(struct ftr_s), 1, faxcf);
        }
fclose(faxcf);

/* Queue the transmission and check for error status. */
regs.h.ah= 0xC8;
regs.h.al= 0x01;
regs.x.dx= (unsigned int)((unsigned long)&fs & 0xFFFF);
int86(0x2F, ®s, ®s);
printf("\n");
if((int)(regs.x.ax) < 0)
        {
        printf("Resident Manager Error: Data may not be sent. (%1)\n",
                (int)(regs.x.ax));
        clean_files(SUCCESSFUL);
        clean_files(FAILURE);
        exit(2);
        }
clean_files(SUCCESSFUL);
clean_files(FAILURE);
exit(0);
}

/*****
 ******
  ***
  ***    Level 2.
  ***
  ***
 ******
 *****/ define MODE_F   (1)    /* Server modes. */
define MODE_O   (2)
#define MODE_PO  (3)
#define MODE_PA  (4)
#define MODE_T   (5)
```

```
/*
    Format of .SND file:
        to
        from
        phone number
        number of files
        d:\path\file1
        d:\path\file2
        .
        .
        .

*/ server(char *p_mode, char *path)
/*      char *p_mode:   mode to invoke server in, from command line
        char *path:     path to look for .SND files, from command line

- Scans the specified path for files with a .SND extension,
          reads any that are found and queues the files they specify for
          transmission. Operates in a many modes as specified by
          a command line help.
*/
{
FILE    *faxcf= (FILE *)NULL;
struct time
        t;
struct date
        d;
int     x,
        mode,
        ttl_sends= 0;
char    pattern[128];
long    start_time,
        run_time= 0;
char    line[128];

start_time= time(0);

strupr(p_mode);
switch(p_mode[0])
        {
        case 'F':       /* Forever; exit on a keypress only */
                mode= MODE_F;
                break;
        case 'O':       /* One; read and process on .SND file then exit */
                mode= MODE_O;
                break;
        case 'P':       /* Pending, must read next character */
                switch(p_mode[1])
        {
                        case 'A': /* Pending All: Process all .SND files
                                        currently in the dir */
                        mode= MODE_PA;
                        break;
                                case 'O': /* Pending One: Process one of the .SND
                                        files currently in the dir */
```

```c
                            mode= MODE_PO;
                            break;
                        default:
                                    printf("Illegal mode specified. (%s)\n", p_mode);
                                    exit(1);
                            break;
                }
            break;
            case '0':        /* Continue processing for a specified amount of time */
            case '1':
            case '2':
            case '3':
            case '4':
            case '5':
            case '6':
            case '7':
            case '8':
            case '9':
                    mode= MODE_T;
                    run_time= atol(p_mode);
                    break;
            default:
                    printf("Illegal mode specified. (%s)\n", p_mode);
                    exit(1);
                    break;
        } strcpy(pattern, path);   /* Construct the wildcard to search for .SND files. */
    if(pattern[strlen(pattern)-1] != '\\')
            strcat(pattern, "\\");
    strcat(pattern, "*.SND");

/* Initialize the Fax Control Block */
    faxcb.type= 0;
    faxcb.tran_type= 0;
    faxcb.status= 1;
    faxcb.time= faxcb.date= 0;
    faxcb.file_off= 383;
    for(x= 0; x < 14; x++)
            faxcb.reserved[x]= 0;
    faxcb.coverpage= 0;
    for (x= 0; x < 101; x++)
        faxcb.reserved1[x]= 0;

for (x= 0; x < 86; x++)
        faxcb.reserved2[x]= 0;

for(x= 0; x < 11; x++)
            ftr.reserved[x]= 0;
    ftr.pages= 0;
    ftr.inches8th= 0;
    ftr.inches= -1;
    for(x= 0; x < 31; x++)
            ftr.reserved1[x]= 0;

/* Start processing .SND files. */
    while(1)
```

```c
{
FILE    *send= (FILE *)NULL;
struct  ffblk
        fileinfo;
char    sendfile[128];

/* While there are no .SND files kill time by cleaning the log queue
   and removing files which have already been sent. */
while(findfirst(pattern, &fileinfo, WILDCARDS | EXTENSION | FILENAME
      | DIRECTORY | DRIVE) == -1)
      {
      clean_files(SUCCESSFUL);
      clean_files(FAILURE);

/* Check if it is time to exit */
      if(mode == MODE_T && time(0) - start_time > run_time)
              exit(0);

/* Have we run out of things to send and are in Pending All
         mode? */
      if(mode == MODE_PA && ttl_sends > 0)
              {
              exit(0);
              }

/* Is there anything to send? */
      if(mode == MODE_PA || mode == MODE_PO)
              {
              printf("No pending sends to process.\n");
              exit(3);
              }

/* Keypress? */
      if(kbhit())
              {
              if(getch() == 27)
                      {
                      printf("Esc pressed; shutting down.\n");
                      exit(0);
                      }
              }
      }
ttl_sends++;    /* Count how many .SND files we process. */ strcpy(sendfile, path);
if(pattern[strlen(sendfile)-1] != '\\')
    strcat(sendfile, "\\");
strcat(sendfile, fileinfo.ff_name);

/* Open .SND file. */
if((send= fopen(sendfile, "rt")) == (FILE *)NULL)
      {
      printf("Unable to open send control file. (%s)\n", sendfile);
      unlink(sendfile);
      continue;
      }
```

```c
        /* Fill in the Fax Control Block */
        fgets(line, 128, send);
        line[strlen(line)-1]= 0;
if(strlen(line) >= 32)
            line[31]= 0;
        strcpy(faxcb.to, line);

fgets(line, 128, send);
        line[strlen(line)-1]= 0;
if(strlen(line) >= 32)
            line[31]= 0;
        strcpy(faxcb.from, line);

fgets(line, 128, send);
        line[strlen(line)-1]= 0;
if(strlen(line) >= 47)
            line[46]= 0;
        strcpy(faxcb.phone, line);

fgets(line, 128, send);
        faxcb.num_files= atoi(line);

if(faxcb.num_files == 0)
            {
            printf("No files to send.\n");
fclose(send);
            unlink(sendfile);
            continue;
            } do      /* Open a unique Fax Control File */
            {
            if(faxcf != (FILE *)NULL)
                fclose(faxcf);
            gettime(&t);
            sprintf(fs.faxcf_filename, "%02X%02X%02X%02X.FCF", t.ti_hour, t.ti_min, t.ti_sec,
                t.ti_hund);
            }
            while((faxcf= fopen(fs.faxcf_filename, "rb")) != (FILE *)(NULL));

gettime(&t);
        getdate(&d);

sprintf(faxcb.appl_tag, "FaxSend 1990 [%1X%02X%02X%02X:%02X:%02X.%02X]%c", d.da_year,
            d.da_mon, d.da_day, t.ti_hour, t.ti_min, t.ti_sec, t.ti_hund,
            (nodelete ? 'N' : 'D'));

if ((faxcf= fopen(fs.faxcf_filename, "wb")) == (FILE *)(NULL))
            {
            printf("Unable to open Fax Control File file for write. (%s)\n",
                fs.faxcf_filename);
            }
        else
            {
            fwrite(&faxcb, sizeof(struct faxcb_s), 1, faxcf);

/* Add a File Transfer Block for each file to be sent. */
```

```
for(x= 1; x <= faxcb.num_files; x++)
        {
        FILE    *test;
        char    file[128];

fgets(line, 128, send);
        line[strlen(line)-1]= 0;
        strcpy(file, line);

fullpath(file);
        if((test= fopen(file, "rb")) == (FILE *)NULL)
                {
                printf("File not found, transfer aborted. (%s)\n", file);
                fclose(faxcf);
                faxcf= (FILE *)NULL;
                unlink(fs.faxcf_filename);
                }
        else
                {
                fclose(test);

if(strcmp(file + strlen(file) - 4, ".TXT") != SAME &&
                   strcmp(file + strlen(file) - 4, ".PCX") != SAME &&
                   strcmp(file + strlen(file) - 4, ".DCX") != SAME &&
                   strcmp(file + strlen(file) - 4, ".132") != SAME)
                        {
                        printf("Unkown file type, must be .PCX, .DCX, .TXT, or .132; tansfer aborted. (%s)\n",
                                file);
                        fclose(faxcf);
                        unlink(fs.faxcf_filename);
                        faxcf= (FILE *)NULL;
                        }
                else
                        {
                        switch(*(file + strlen(file) - 3))
                                {
                                case 'T':
                                        ftr.file_type= 0;
                                        ftr.text_size= 0;
                                        break;
                                case '1':
                                        ftr.file_type= 0;
                                        ftr.text_size= 1;
                                        break;
                                case 'P':
                                        ftr.file_type= 1;
                                        break;
                                case 'D':
                                        ftr.file_type= 2;
                                        break;
                                }
                        strcpy(ftr.file, file);
                        printf("Sending: %s\n", file);
                        fwrite(&ftr, sizeof(struct ftr_s), 1, faxcf);
                        }
                }
        }
```

```c
            if(faxcf != (FILE *)NULL)
                {
                fclose(faxcf);

regs.h.ah= 0xCB;
                regs.h.al= 0x01;
                regs.x.dx= (unsigned int)((unsigned long)&fs & 0xFFFF);
                int86(0x2F, ®s, ®s);
                printf("\n");
                if((int)(regs.x.ax) < 0)
                        {
                        printf("Resident Manager Error: Data may not be sent. (%l)\n",
                                (int)(regs.x.ax));
                        }
                }
            } fclose(send);
    unlink(sendfile);       /* Erase the .SND file. */
    clean_files(SUCCESSFUL);
    clean_files(FAILURE);

if(mode == MODE_O || mode == MODE_PO)
            exit(0);
    }
}

/*****
******
***
***     Utility Functions.
***
******
*****/ clean_files(int which)
/*      int which:      Clean either successful or failed transmissions

- Cleans the CCAM's log queue of entries, erases the files
          which have been send, and records the outcome and statistics
          of transmissions to the log file.
*/
{
FILE    *sendfax_log;

if((sendfax_log= fopen(logfile, "at")) == (FILE *)NULL)
        {
        printf("Unable to open log file. (%s)\n", logfile);
        return;
        }
/* Set up to search the queue. */
regs.h.ah= 0xCB;
regs.h.al= 0x05;
regs.x.cx= which;
regs.h.dh= 0;
regs.h.dl= 2;
```

```c
int86(0x2F, ®s, ®s);

while(regs.x.ax == 0)   /* Entry to process as long as there is a queue: */
    {
    int     event_handle;

/* Open the FCF of the queue entry. */
    event_handle= regs.x.bx;
    regs.h.ah= 0xC8;
    regs.h.al= 0x07;
    regs.h.dl= 2;
    int86(0x2F, ®s, ®s);

if(regs.x.ax == 0)      /* Successfully opened file? */
        {
        int     handle;

handle= regs.x.bx; /* Record the DOS file handle, and read
                              in the FCF. */
        _read(handle, &faxcb, sizeof(struct faxcb_s));

/* If it's one of ours */
        if( (faxcb.status == 0 || faxcb.status == 5)
        && strncmp(faxcb.appl_tag, "FaxSend 1990 [", 14) == SAME)
            {
            char    date[9],
                    time[12];

/* Find the date and time of queuing. */
            strncpy(date, faxcb.appl_tag + 14, 8);
            strncpy(time, faxcb.appl_tag + 22, 11);
            date[8]= time[11]= 0;

/* Delete all the sent files associated with this log
               if their delete flag is set; add a line
               to the log file for each. */
            while(faxcb.num_files--)
                {
                _read(handle, &ftr, sizeof(struct ftr_s));
                if(faxcb.appl_tag[34] == 'D')
                    unlink(ftr.file);
                fprintf(sendfax_log, "%c,\"%s\",%s,\"%s\",\"%s\",%l\n",
                        (faxcb.status == 0 ? 'T' : 'F'),
                        faxcb.phone,
                        date,
                        time,
                        ftr.file,
                        ftr.pages);
                }
            }

_close(handle);
        /* Delete the queue entry and FCF. */
        regs.h.ah= 0xC8;
        regs.h.al= 0x08;
        regs.h.dl= 2;
        regs.x.bx= event_handle;
        int86(0x2F, ®s, ®s);
        }
```

```
        /* Find next queue entry. */
        regs.h.ah= 0xCB;
        regs.h.al= 0x86;
        regs.h.dl= 2;
        int86(0x2F, ®s, ®s);
        } fclose(sendfax_log);
  } fullpath(char *partial)
/*      char *partial: A path to a file.
                        May be a non-explicit path to a file relative to the
                        current dir, a path without a drive specification,
                        or any other incomplete form of the path.

- Will construct a full explicit path given a path relative to
          the current directory, the current directory on another drive,
          or an explicit path on the current or any other drive.
*/
{
char    path[128],
        cwd[128],
        *i;

strupr(partial);

getcwd(cwd, 128);

if(partial[1] == ':')   /* Check for a ?: on the front, denoting a drive. */
        {
        int     drive;

drive= getdisk();
        i= partial + 2;
        setdisk(*partial - 'A');
        getcwd(cwd, 128);             /* Find drive's CWD */
        setdisk(drive);
        }
else
        {
        i= partial;
        }
path[0]= cwd[0];                      /* Copy down the drive. */
path[1]= cwd[1];
path[2]= 0;
if(cwd[strlen(cwd) - 1] != '\\')      /* Add a slash to the cwd. */
        strcat(cwd, "\\");

if (*i == '\\')
        {
        strcat(path, i);
        }
else
        {
        strcat(path, cwd + 2);
        strcat(path, i);
        } strcpy(partial, path);
}
```

APPENDIX E
Program Fax2Pcx

The role of the package Fax2Pcx is to produce a bitmap of a given blank form in PCX format which can then be output through either the Intel Fax Card or to any other capable output device.

Once forms have been created with FaxDes they need to be produced in some form of a hard copy so they can be utilized. Fax2Pcx takes the information stored in an .FRM file created with FaxDes and produces a .PCX file which can be then printed or otherwise manipulated. The software which comes with the Intel Connection Coprocessor supports the editing and printing of .PCX files. In this manner, forms produced with the FaxDes package can be enhanced with graphics and/or logos and then printed to any of the printing devices supported by Intel's graphics editing software. Also, .PCX files can be sent to a fax machine for output via the FaxSend utility.

Fax2Pcx is most often used to produce forms on demand and then fax them to the end users, sometimes, however, the production of forms occurs as a batch event. Fax2Pcx has, therefore, two methods of access which tailor to one or the other need. The first method is a fast and convenient command-line mode which allows for the production of one form at the time by entering all the needed information on the command line. The second method is a batch mode which allowing for the creation of a file which contains the specifications for the forms to be created and serves as a basis for performing all the conversions to .PCX files at one time.

Included are three flowcharts and a source code for a program Fax2Pcx.

| FLOWCHART | System<br>I-Fax | Chart No.<br>1 | Page No.<br>1 |
|---|---|---|---|
| | Procedure<br>Fax2Pcx | Author<br>E.Chwialkowska | Effective Date<br>Jan 25, 1991 |
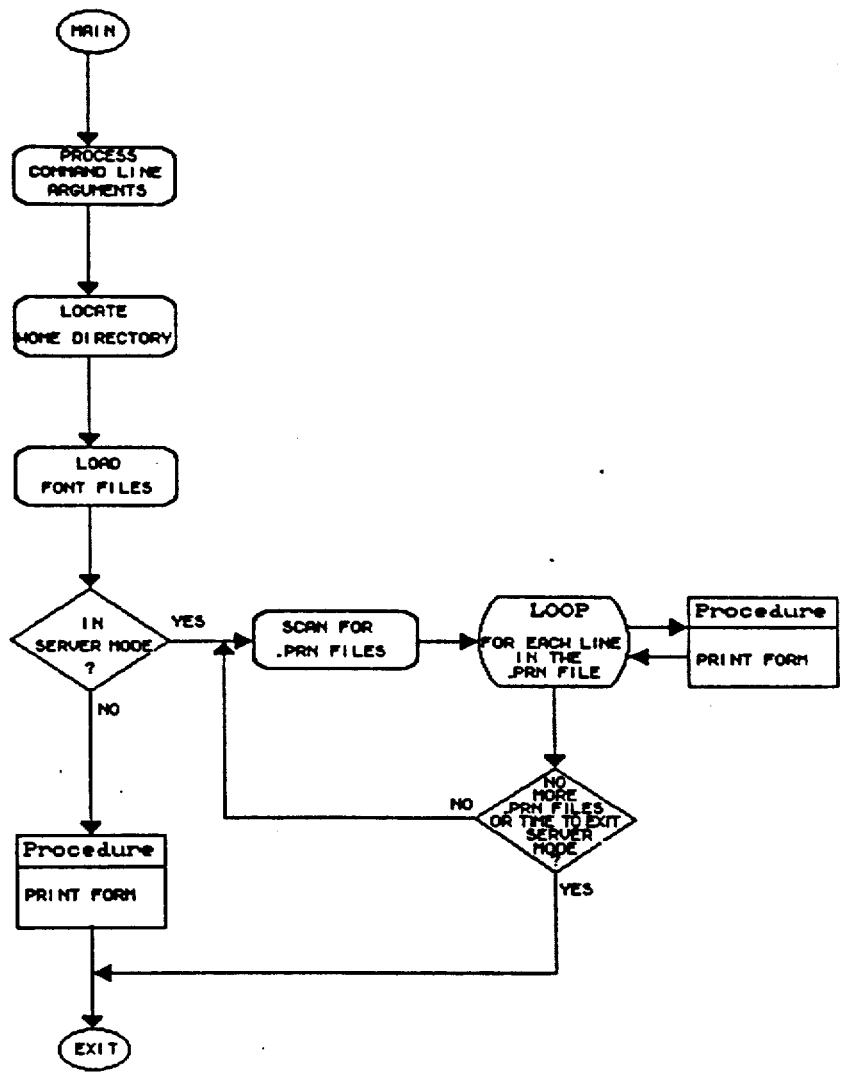

| FLOWCHART | System<br>I-Fax | Chart No.<br>2 | Page No.<br>1 |
|---|---|---|---|
| | Procedure<br>Fax2Pcx | Author<br>E. Chwialkowska | Effective Date<br>Jan 25, 1991 |
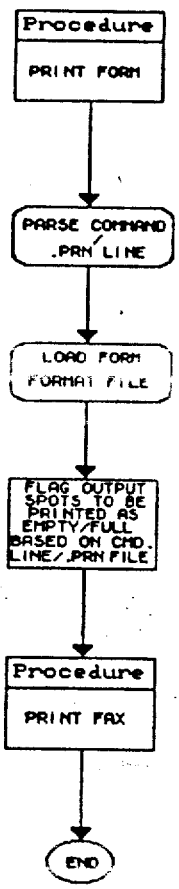

| FLOWCHART | System<br>I-Fax | Chart No.<br>3 | Page No.<br>1 |
|---|---|---|---|
| | Procedure<br>Fax2Pcx | Author<br>E.Chwialkowska | Effective date<br>Jan 25, 1991 |
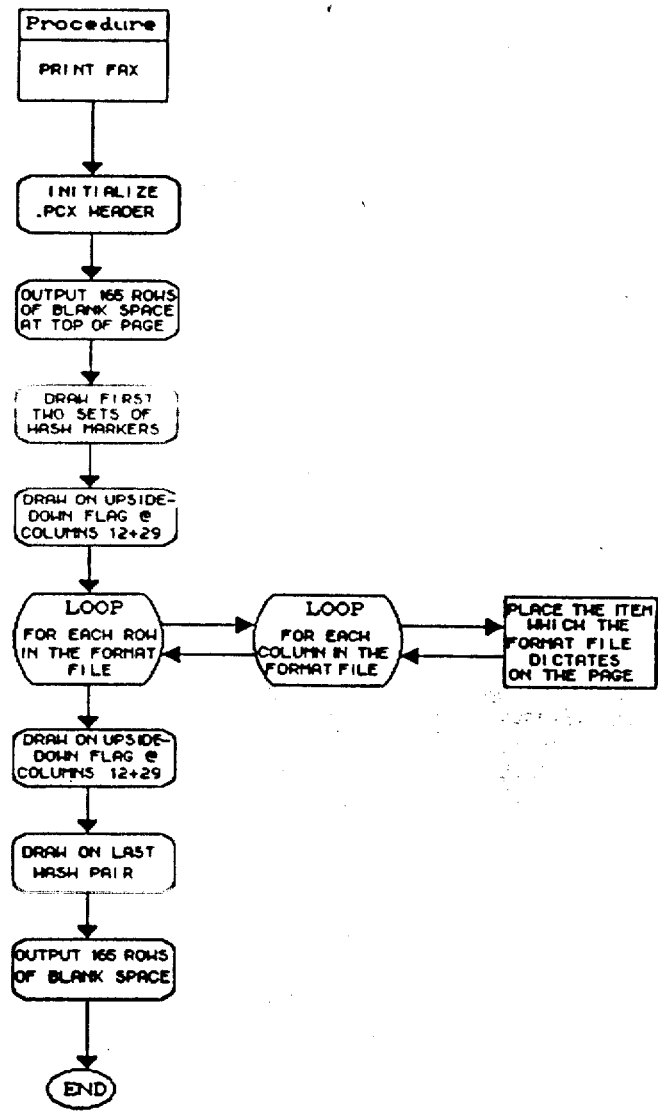

```
/******
 ***
 ***   File:     fax2pcx.c
 ***   Purpose:  To produce a bitmap of a given blank form in PCX format
 ***             which can then be output through the Intel Fax Card
 ***             or to any other capable output device.
 ***
 ******
 ******/

/ include <dos.h>
include <stdio.h>
#include <string.h>
#include <alloc.h>
#include "fax.h"
#include "faxdir.h"

int     form= 0,
        Row,
        Col,
        inline= 0;      /* Current # of lines read from input file. */ int     MAX_ROWS;       /* Number of rows on current form. */ char    *spots= (char *)NULL,   /* Dynamically allocated space for grid. */
        *line= (char *)NULL;    /*       "            "    input line buffer. */ struct s_string
        strings[127];           /* Structure to hold strings found on
                                   the form. */ struct pcx_header_s     /* Header to be placed on the start of all PCX files
                           produced. See ZSoft documentation for details. */
        {
        char    id,
                version,
                encode,
                bpp;
        int     x1,
                y1,
                x2,
                y2,
                hres,
                vres;
        char    palette[48],
                reserved,
                nplanes;
        int     bpl;
        char    __unused[60];
        };

typedef unsigned char
        pcx_line[216];  /* Storage for one line of a PCX bitmap. */ pcx_line                /* Storage for a 'window' into the PCX bitmap. */
        bitmap[66];
```

```
char    cur= 33,       /* Bitmap line numbers for the current page row and */
        last= 0;       /* the last page row being output. */

FILE    *pcx_file;
unsigned char
        *smallfont= (unsigned char *)NULL,     /* [6789] */
        *largefont= (unsigned char *)NULL;     /* [28838] */ char    exe_dir[128];

/*****
******
***
***     Level 1.
***
******
*****/ main(int argc, char **argv)
{
FILE    *file,
        *fontfile;

printf("Fax2PCX           (c) Copyright 1990 by Worthington\n");
printf("                  Software Company, All Rights Reserved.\n\n");

argc--;

if (argc == 0)
        {
        printf("Usage:\n");
        printf("      FAX2PCX @[d:][path]filename[.PRN]\n");
        printf("\n    Lines in this file take the form:\n");
        printf("      form/,[d:][path]output_file[,output spot info...]\n\n");
        printf("      OR\n\n");
        printf("      FAX2PCX form/ [d:][path]output_file [output spot info...]\n\n");
        printf("* 'output_file' should NOT have an extension (\".PCX\" is added to the filename\n");
        printf("  given).\n\n");
        done(1);
        } if((line= (char *)malloc(1024)) == (char *)NULL)
        {
        printf("Not enough memory to allocate line buffer. (1K)\n");
        done(1);
        }
```

```c
find_exe_dir(exe_dir, argv[0]); /* Locate the home directory. */ strcat(exe_dir, "SMALL.FNT");
if((fontfile= fopen(exe_dir, "rb")) == (FILE *)NULL)
        {
        printf("Unable to open font file for read. (%s)\n", exe_dir);
        done(1);
        }
justpath(exe_dir);
if((smallfont= malloc(6789)) == (unsigned char *)NULL)
        {
        printf("Not enough memory to create font table. (6.6K)\n");
        done(1);
        }
fread(smallfont, 6789, 1, fontfile);
fclose(fontfile);

strcat(exe_dir, "LARGE.FNT");
if((fontfile= fopen(exe_dir, "rb")) == (FILE *)NULL)
        {
        printf("Unable to open font file for read. (%s)\n", exe_dir);
        done(1);
        }
justpath(exe_dir);

if((largefont= malloc(28838)) == (unsigned char *)NULL)
        {
        printf("Not enough memory to create font table. (28.1K)\n");
        done(1);
        }
fread(largefont, 28838, 1, fontfile);
fclose(fontfile);

/* Process command line arguments. */
if(argv[1][0] != '@')
        {               /* If invoked in command line mode create a
                           virtual input line as if from a control file
                           with the arguments on the command line
                           and pass it for processing. */
        int    x;

strcpy(line, argv[1]);
        for(x= 2; x <= argc; x++)
                {
                strcat(line, ",");
                strcat(line, argv[x]);
                }
        print_form(line);
        }
else            /* Read instructions from a control file and process them. */
        {
        if((file= fopen(argv[1]+1, "rt")) == (FILE *)NULL)
                {
                char fname[128];
```

```
        strcpy(fname, argv[1]+1);
        strcat(fname, ".PRN");
        if((file= fopen(fname, "rt")) == (FILE *)NULL)
            {
            printf("Unable to open input file. (%s)\n", argv[1]+1);
            done(1);
            }
        } if (file != (FILE *)NULL)
        {
        while(!feof(file))
            {
            line[0]= ' ';
            while( !(line[0] >= '0' && line[0] <= '9') && !feof(file))
                {
                fgets(line, 1024, file);
                inline++;
                }
            if (!feof(file))
                print_form(line);
            }
        fclose(file);
        }
    }
printf("\n");
done(0);
}

/*****
******
***
***    Level 2.
***
******
*****/ print_form(char *spec)
/*      char *spec:     A character string in the format specified for .PRN
                        files to control the creation of the PCX file.

- Parses the passed string to determine which form, what output
          filename and what pattern of output spots to use when creating
          the bitmap.
        - Calls print_fax to create the bitmap.
*/
{
FILE    *datafile;
```

```
char    dfile[128],
        *i,
        *i2,
        v,
        pcx_filename[128];

/* Parse the passed line. */ i= spec;
form= atoi(i);  /* The form number to print. */ if (form < 1 || form > 9999)
        {
        if(inline > 0)
                printf("%31: Illegal form number. (%i)", inline, form);
        else
                printf("Illegal form number. (%i)\n", form);
        return;
        }
sprintf(dfile, "%s%041.FRM", exe_dir, form);
if((datafile= fopen(dfile, "rb")) == (FILE *)NULL)
        {
        if (inline > 0)
                printf("%31: Unable to open form datafile. (%s)", inline, dfile);
        else
                printf("Unable to open form datafile. (%s)\n", dfile);
        return;
        }

/* Read in the blank form specification. */
fread(&MAX_ROWS, sizeof(int), 1, datafile);
if(spots != (char *)NULL)
        free(spots);
if((spots= (char *)malloc(MAX_ROWS * 40)) == (char *)NULL)
        {
        printf("Not enough memory to create page.\n");
        done(1);
        } fread(spots, MAX_ROWS * 40, 1, datafile);
fread(strings, 127, sizeof(struct s_string), datafile);
fclose(datafile);

while(*i >= '0' && *i <= '9')   /* Skip to the next field. */
        i++;

if(*i != ',')
        {
        if (inline > 0)
                printf("%31: Illegal line format. (missplaced/missing comma)", inline);
        else
                printf("Illegal line format. (missplaced/missing comma)\n");
        return;
        }
```

```
i++;
i2= i;
while(*i != ',' && *i != 0 && *i != '\n')
        i++;

v= *i;
*i= 0;
strcpy(pcx_filename, i2);        /* Obtain the output file name. */
strcat(pcx_filename, ".PCX");
*i= v;

/* Fill in the output spots in the pattern defined on the spec line. */
Row= Col= 1;
while(*i == ',' && Row <= MAX_ROWS)    /* While there are more things on
                                          the spec line and there are more
                                          output spots to fill in. */
        {
        i++;
        /* Find the next output spot on the blank form. */
        while(spot(Row, Col) != OUTPUT && Row <= MAX_ROWS)
                {
                Col++;
                if (Col > 40)
                        {
                        Col= 1;
                        Row++;
                        }
                }
        if(Row <= MAX_ROWS)
                {
                /* Should we fill it in? */
                switch(*i)
                        {
                        case 't':
                        case 'T':
                        case 'y':
                        case 'Y':
                        case '1':
                                spot(Row, Col)= OUTON;
                                break;
                        case 'f':
                        case 'F':
                        case 'n':
                        case 'N':
                        case '0':
                                spot(Row, Col)= OUTOFF;
                                break;
                        default:
                                *(i+1)= 0;
                                if (inline > 0)
                                        printf("%31: Unknown output spot specifier. (%s)",
                                                inline, i);
                                else
                                        printf("Unknown output spot specifier. (%s)\n", i);
                                return;
                        }
                }
```

```
        i++;
        } strupr(pcx_filename);
print_fax(pcx_filename);        /* Create the bitmap. */
}

/*****
        ******
        ***
        ***     Level 3.
        ***
        ******
        *****/

/* Turn on the bit at the specified row and column on the bitmap. */
#define pcx_setbit(r, c) bitmap[(r)][(int)(((c)-1)/8)]&= ~(1 << (7 - (((c)-1) % 8)))

/* Get the status of the given bit for the given character of the
   small font. */
#define getsmallbit(ch, x, y) ((ch) < 33 || (ch) > 125 || (ch) == 124 ? OFF :\
((smallfont[((ch) - 33) * 73 + (int)(((y)*28 + (x))/8)] >> (((y)*28 + (x)) % 8)) & 1))
/* Get the status of the given bit for the given character of the
   large font. */
#define getlargebit(ch, x, y) ((ch) < 33 || (ch) > 125 || (ch) == 124 ? OFF :\
((largefont[((ch) - 33) * 318 + (int)(((y)*48 + (x))/8)] >> (((y)*48 + (x)) % 8)) & 1))

print_fax(char *pcx_filename)
/*      char *pcx_filename:     The name of the file to send PCX output to.

- This function starts at the top of the blank form and moves
          down and left to right adding artifacts to a blank PCX bitmap
        /*as it encounters them in the blank form definition.
        - A 'window' onto the PCX file tall enough to hold two form rows
          is maintained in memory. When one form row is completed the
          window scrolls down by outputting the older of the two form
          rows to the PCX file, scrolling the current form row up (making
          it the older form row) and creating a new blank form row.
*/
{
int     x,
        y;
struct pcx_header_s
        pcx;
struct time
        t;
```

```c
pcx_file= (FILE *)NULL;

/* Initialize the PCX file header with the necessary information. See the
   ZSoft documentation for specific information on field contents. */
pcx.id= 0x0A;
pcx.version= 2;
pcx.encode= 1;
pcx.bpp= 1;
pcx.x1= pcx.y1= 0;
pcx.x2= 1727;
pcx.y2= 33*(MAX_ROWS + 4) + 318;
pcx.hres= 648;
pcx.vres= 288;
for(x= 0; x < 48; x++)
        pcx.palette[x]= 0;
pcx.reserved= 0;
pcx.nplanes= 1;
pcx.bpl= 216;
for(x= 0; x < 60; x++)
        pcx.__unused[x]= 0;

/* Open the PCX filename for output. */
if ((pcx_file= fopen(pcx_filename, "wb")) == (FILE *)(NULL))
        {
        if (inline > 0)
                printf("%%31: Unable to open PCX file for write. (%s)", inline,
                        pcx_filename);
        else
                printf("Unable to open PCX file for write. (%s)\n", pcx_filename);
        return;
        }

/* Write the header to the file. */
fwrite(&pcx, sizeof(struct pcx_header_s), 1, pcx_file);

/* Initialize the 'window' onto the bitmap to be all blank. */
for(y= 0; y < 66; y++)
        for(x= 0; x < 216; x++)
                bitmap[y][x]= 0xFF;
cur= 33;        /* Set up pointers to the top of the current and last form */
last= 0;        /* rows into the lines[] bitmap array. */

/* Output approx 3/4" of blank space at the top of the form. */
for(x= 1; x <= 161; x++)
        pcx_write_line(cur);

/* Add the first two sets of hashes to the form. */
pcx_left_hash(last);    /* This set are the initial pair and have nothing */
pcx_right_hash(last);   /* between them (ie, no spots, numerics, text, etc). */
pcx_left_hash(cur);
pcx_right_hash(cur);

/*      Add the spots which signal the scanning software that they are
        seeing a 'right-side-up' form. */
pcx_addspot(cur, 12, OFF);
pcx_addspot(cur, 29, OFF);
```

```c
/*      Add the spots which encode the form number onto the top of the
        page so that the scanning software can call up the blank form
        layout to know what it is processing. */
for(x= 0; x < 16; x++)
    {
    if((form >> x) & 1)
            pcx_addspot(cur, 28 - x, ON);
    else
            pcx_addspot(cur, 28 - x, OFF);
    }

/* Write out the very first row of the form (the one with the initial
   hash marks) and scroll the window down the page. */
pcx_write_last();

/* Cycle through all the rows in the form layout, top to bottom. */
for(Row= 1; Row <= MAX_ROWS; Row++)
        {
        int    col;

col= 178;       /* Column location on the bitmap for the first
                           possible artifact. */
        pcx_left_hash(cur);     /* Add the left and right hash marks. */
        pcx_right_hash(cur);

if (inline > 0)         /* Show status to screen. */
                printf("%31: Row %031 Col 01\r", inline, Row);
        else
                printf("Row %031 Col 01\r", Row);

/* For each column on the current row: */
        for(Col= 1; Col <= 48; Col++)
                {
                int    r,
                       c,
                       s;

col+= 33;
                if (spot(Row, Col) != BLANK)    /* If we have something to
                                                   add to the bitmap. */
                        {
                        if (inline > 0)
                                printf("%31: Row %031 Col %021\r", inline, Row, Col);
                        else
                                printf("Row %031 Col %021\r", Row, Col);

switch(spot(Row, Col))
                                {
                                case INPUT:    /* Empty box */
                                case OUTPUT:
                                case OUTOFF:
                                        pcx_addspot(cur, Col, OFF);
                                        break;
                                case OUTON:    /* Filled box */
                                        pcx_addspot(cur, Col, ON);
                                        break;
                                case DIGIT_UL: /* First row of numeric */
```

```c
/* Draw sides */        for(r= cur + 4; r < cur + 33; r++)
                            {
                                pcx_setbit(r, col);
                                pcx_setbit(r, col + 87);
                            }
/* Draw inner sides */  for(r= cur + 25; r < cur + 33; r++)
                            {
                                pcx_setbit(r, col + 21);
                                pcx_setbit(r, col + 66);
                            }
/* Draw top */          for(c= col + 1; c < col + 87; c++)
                                pcx_setbit(cur + 4, c);
/* Top of inside */     for(c= col + 22; c < col + 66; c++)
                                pcx_setbit(cur + 25, c);
                        Col+= 2;
                        col+= 66;
                        break;
                case DIGIT_2:   /* Second row of numeric */
/* Draw sides */        for(r= cur; r < cur + 33; r++)
                            {
                                pcx_setbit(r, col);
                                pcx_setbit(r, col + 87);
                            }
/* Draw inner sides */  for(r= cur; r <= cur + 4; r++)
                            {
                                pcx_setbit(r, col + 21);
                                pcx_setbit(r, col + 66);
                            }
/* Draw inner sides */  for(r= cur + 25; r < cur + 33; r++)
                            {
                                pcx_setbit(r, col + 21);
                                pcx_setbit(r, col + 66);
                            }
/* Draw inner top/bottom */ for(c= col + 22; c < col + 66; c++)
                            {
                                pcx_setbit(cur + 4, c);
                                pcx_setbit(cur + 25, c);
                            }
                        Col+= 2;
                        col+= 66;
                        break;
                case DIGIT_3: /* Third row of numeric */
/* Draw sides */        for(r= cur; r <= cur + 25; r++)
                            {
                                pcx_setbit(r, col);
                                pcx_setbit(r, col + 87);
                            }
/* Draw inner sides */  for(r= cur; r <= cur + 4; r++)
                            {
                                pcx_setbit(r, col + 21);
                                pcx_setbit(r, col + 66);
                            }
/* Draw bottom */       for(c= col + 1; c < col + 87; c++)
                                pcx_setbit(cur + 25, c);
/* Draw inner bottom */ for(c= col + 22; c < col + 66; c++)
                                pcx_setbit(cur + 4, c);
                        Col+= 2;
```

```
                                col+= 66;
                                break;
                        default:
                                /* We have a string */
                                s= spot(Row, Col) - 1;
                                if(s >= 0 && s < 127 && strings[s].row == Row &&
                                        strings[s].col == Col)
                                                print_string(s);
                                Col+= (strings[s].dlen - 1);
                                col+= 33 * (strings[s].dlen - 1);
                                break;
                        }
                }
        }
        /* Scroll the window. */
        pcx_write_last();
        }

/* We're now at the bottom of the form. */
pcx_left_hash(cur);
pcx_right_hash(cur);

/* Add spots which flag the scanner that it's reading a page upside down. */
pcx_addspot(cur, 12, ON);
pcx_addspot(cur, 29, ON);

/* Encode the form number onto the page. */
for(x= 0; x < 16; x++)
        {
        if((form >> x) & 1)
                pcx_addspot(cur, x + 13, ON);
        else
                pcx_addspot(cur, x + 13, OFF);
        } pcx_write_last();
pcx_left_hash(cur);
pcx_right_hash(cur);
pcx_write_last();
pcx_write_last();

/* Add about 3/4" of blank space at the end. */
for(x= 1; x <= 158; x++)
        pcx_write_line(cur);

fclose(pcx_file);

/* Notify that we're done. */
if (inline > 0)
        printf("%31: %s created. \n", inline, pcx_filename);
else
        printf("%s created. \n", pcx_filename);
}
        /*****
        ******
        ***
```

```
***     Level 4.
***
****
******
*****/

/
```

```c
pcx_left_hash(int which)
/*      int which:      Which form row to place the hash on (cur or last).

- This function places the lefthand hash for the specified row
          on the PCX bitmap.
        - The hashes are used at scan time to align the scanner's
          perspective of its location on the page.
*/
{
int     r,
        c;

for(r= which + 4; r < which + 26; r++)
        for(c= 138; c < 181; c++)
                pcx_setbit(r, c);
} pcx_right_hash(int which)
/*      int which:      Which form row to place the hash on (cur or last).

- This function places the righthand hash for the specified row
          on the PCX bitmap.
        - The hashes are used at scan time to align the scanner's
          perspective of its location on the page.
*/
{
int     r,
        c;

/* Draw a filled rectangle at the correct location. */
for(r= which + 4; r < which + 26; r++)
        for(c= 1558; c < 1681; c++)
                pcx_setbit(r, c);
} pcx_addspot(int which, int col, int val)
/*      int which:      Which form row to place spot on (cur or last).
        int col:        Which form column to place spot at (1 - 48).
        int val:        Whether the box should be empty (OFF) or full (ON).

- This function creates a box on the PCX bitmap at the perscribed
          location.
        - The box can either be filled or empty (to be filled in by the
          user when the form is being used).
*/
```

```
{
int     r,
        c;

r= which + 4;           /* Bitmap row to start at. */
c= col= 211 + (33 * (col - 1)); /* Bitmap column to start at. */ if (val == ON)  /* Create the ON box by filling in a square. */
        {
        for(; r < which + 26; r++)
                {
                for(c= col; c < col + 22; c++)
                        {
                        pcx_setbit(r, c);
                        }
                }
        }
else    /* Create an OFF box by drawing its edges. */
        {
        for(;r < which + 26; r++)       /* Draw the sides. */
                {
                pcx_setbit(r, c);
                pcx_setbit(r, c + 21);
                }
        for(;c < col + 22; c++)         /* Draw the top and bottom. */
                {
                pcx_setbit(which + 4, c);
                pcx_setbit(which + 25, c);
                }
        }
} pcx_write_last()
/*      - 'Scrolls' the window down the page onto the bitmap which we are
          constructing by outputting the last form row to the PCX file
          and making the current row the last row.
*/
{
int     r,
        c;

/* Save the last form row to the PCX file, and blank the bitmap it used. */
for(r= last; r < last + 33; r++)
        {
        pcx_write_line(r);
        for(c= 0; c < 216; c++)
                bitmap[r][c]= 0xFF; /* Make each line all white. */
        } r= last;        /* Adjust internal pointers to make the current row into
                   the last row. */
last= cur;
cur= r;
} print_string(int s)
```

```
/*      int s:  Index into the strings[] array of the string to print on
                the form.

- Places the string pointed to by the passed index onto the
          bitmap at its correct column location on the current, and
          possibly preceeding, form row (if the font is LARGE).
*/
{
int     col,
        c;

/* Find the column to start output at on the bitmap depending on whether
   the font is left, right, or centered. */
if(strings[s].locale >= 41 && strings[s].locale <= 80)
        {
        col= 211 + (33 * (strings[s].locale - 41));
        }
else if (strings[s].locale >= 81 && strings[s].locale <= 120)
        {
        col= 233 + (33 * (strings[s].locale - 81)) - ((strings[s].font == SMALLFONT ?
                20 : 40) * strlen(strings[s].text));
        }
else
        {
        col= 222 + (33 * (strings[s].locale - 1)) - ((strings[s].font == SMALLFONT ?
                10 : 20) * strlen(strings[s].text));

}

/* For each character in the text */
for(c= 0; c < strlen(strings[s].text); c++)
        {
        int     x,
                y;

/* Write current char onto the bitmap and advance to the start
           of the next character location. */
        if(strings[s].font == SMALLFONT)
                {
                for(x= 0; x < 20; x++)
                        for(y= 0; y < 29; y++)
        {
                                if (getsmallbit(strings[s].text[c], x, y))
          {
                                        pcx_setbit(cur + 4 + y, col + x);
         }
        } col+= 20;       /* Advance to the start of the next
                                   character location. */
                }
        else
                {
                /* Write the piece of the LARGE font which falls onto the
                   last form row. */
                for(x= 0; x < 40; x++)
```

```
        {
        for(y= 0; y < 29; y++)
            {
            if (getlargebit(strings[s].text[c], x, y))
                {
                pcx_setbit(last + 4 + y, col + x);
                }
            }

/* Write out the piece which falls on the current
               form row. */
            for(y= 29; y < 62; y++)
                {
                if (getlargebit(strings[s].text[c], x, y))
                    {
                    pcx_setbit(cur + y - 29, col + x);
                    }
                }
            }
        col+= 48;      /* Advance to the start of the next character
                          location. */
        }
    }
}
/

/*****
 ******
 ***
 ***    Utility Functions.
 ***
 ******
 *****/ pcx_write_line(int line)
/*      int line:       The index into the lines[] array (which holds the
                        current accessable window onto the PCX file) to
                        output to the PCX file.

- Given an index into the lines[] array this fuction outputs
          that scanline to the PCX output file in proper PCX RLE format.
*/
{
unsigned char
        rl,
        c,
        *l;

l= bitmap[line];
```

```
/* Write out the line and properly Run Length Encode it as per the ZSoft
   standard for PCX files. */
while(l < bitmap[line] + 216)
    {
    rl= 0;
    c= *l;
    while(rl < 63 && *l == c && l < bitmap[line] + 216)
        {
        l++;
        rl++;
        }
    if(rl > 1 || ((c & 0xC0) == 0xC0))
        {
        rl|= 0xC0;
        fwrite(&rl, 1, 1, pcx_file);
        }
    fwrite(&c, 1, 1, pcx_file);
    }
} done(int e)
/*      int e: Errorlevel to pass to DOS on exit

- Free()s any memory which has been allocated and exit()s to DOS
          with the passed errorlevel.
*/
{ if(spots != (char *)NULL)
        free(spots);
if(line != (char *)NULL)
        free(line);
if(smallfont != (unsigned char *)NULL)
        free(smallfont);
if(largefont != (unsigned char *)NULL)
        free(largefont);

exit(e);
}
```

I claim:

1. An information retrieval system based on facsimile communication between a central location and a series of other locations, the system comprising:
   - (a) a facsimile transmitting facility at each of the other locations, each transmitting facility converting data on a paper form having a preset format into electronic images;
   - (b) a facsimile receiving facility at the central location for receiving the electronic images; and,
   - (c) a computer connected to the facsimile receiving facility, the computer generating the preset format and using knowledge of that format to create from the electronic images data files having a content corresponding to the data on the paper form.

2. An information retrieval system based on facsimile communication between a central location and a series of other locations, the system comprising:
   - (a) a facsimile transmitting facility at each of the other locations, each transmitting facility converting data on a paper form having a preset format into electronic images, each of the other locations also having a facsimile receiving facility;
   - (b) a facsimile receiving facility at the central location for receiving the electronic images, the central location also having a facsimile transmitting facility; and, (c) a computer connected to the facsimile receiving facility and having knowledge of the preset format on the paper form, the computer using that knowledge to create from the electronic images data files having a content corresponding to the data on the paper form, the preset format for the paper form being transmitted from the facsimile transmitting facility at the central location to the facsimile receiving facility at each of the other locations.

3. An information retrieval system based on facsimile communication between a central location and a series of other locations, the system comprising:
  (a) a facsimile transmitting facility at each of the other locations, each transmitting facility converting data on a paper form having a preset format into electronic images, each of the other locations also having a facsimile receiving facility;
  (b) a facsimile receiving facility at the central location for receiving the electronic images, the central location also having a facsimile transmitting facility; and,
  (c) a computer connected to the facsimile receiving facility and having knowledge of the preset format on the paper form, the computer using that knowledge to create from the electronic images data files having a content corresponding to the data on the paper form, the computer using the content of the data files to continuously update a series of internal data bases; wherein the facsimile transmitting facility at each of the other locations is used to request data in the series of data bases and wherein the facsimile receiving facility at each of the other locations is used to receive the requested data.

4. A process for transferring data to a central location having a facsimile receiving facility from a series of other locations each having a facsimile transmitting facility, the process comprising the steps of:
  (a) preparing multiple copies of a paper form having a specified format;
  (b) distributing at least one copy of the paper form to each of the other locations;
  (c) receiving on the receiving facility at the central location electronic images of data on the paper form fed into the transmitting facility at any of the other locations;
  (d) interpreting the received electronic images by means of a computer connected to the receiving facility and having knowledge of the specified format on the paper form at the other locations; and,
  (e) creating data files from the interpreted electronic images by means of the computer.

5. A process as in claim 4, wherein the specified format for the paper form used in step (a) is prepared by the computer connected to the receiving facility for interpreting the electronic images in step (d).

6. A process as in claim 4 or 5, wherein each of the other locations also has a facsimile receiving facility and wherein the central location also has facsimile transmitting facility, and wherein the distribution of the paper form in step (b) is performed by transmitting a copy of the paper form from the transmitting facility at the central location to the receiving facility at each of the other locations.

* * * * *